United States Patent
Vessels

(10) Patent No.: US 12,039,316 B2
(45) Date of Patent: Jul. 16, 2024

(54) SYSTEMS AND METHODS FOR SECURE MAINTENANCE DEVICE FOR CYBER-PHYSICAL SYSTEMS

(71) Applicant: Honeywell International Inc., Charlotte, NC (US)

(72) Inventor: Ly Vessels, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 107 days.

(21) Appl. No.: 17/239,113

(22) Filed: Apr. 23, 2021

(65) Prior Publication Data
US 2021/0334084 A1      Oct. 28, 2021

Related U.S. Application Data

(60) Provisional application No. 63/014,851, filed on Apr. 24, 2020.

(51) Int. Cl.
G06F 8/65      (2018.01)
G06F 9/455     (2018.01)
(Continued)

(52) U.S. Cl.
CPC ............ *G06F 8/65* (2013.01); *G06F 9/45558* (2013.01); *G06F 21/32* (2013.01); *H04L 9/3247* (2013.01);
(Continued)

(58) Field of Classification Search
CPC ........ G06F 8/65; G06F 9/45558; G06F 21/32; G06F 2009/45587; H04L 9/3247;
(Continued)

(56) References Cited

U.S. PATENT DOCUMENTS

| 11,336,459 B2 * | 5/2022 | Schmitt ................ H04L 67/306 |
| 2015/0058619 A1 * | 2/2015 | Sweet ................. H04L 63/0428 |
| | | 713/155 |

(Continued)

FOREIGN PATENT DOCUMENTS

| EP | 2852118 A1 * | 3/2015 | ......... H04L 63/0853 |
| GB | 2547472 A  * | 8/2017 | ............. G06F 21/33 |

OTHER PUBLICATIONS

Ruiz-Arenas et al, "Towards the Maintenance Principles of Cyber-Physical Systems", 2014, [Online], pp. 815-831, [Retrieved from inernet on Mar. 11, 2024], <chrome-extension://efaidnbmnn-nibpcajpcglclefindmkaj/https://repository.eafit.edu.co/server/api/core/bitstreams/e2174459-61e2-4140-bb06-ef2a49ec100> (Year: 2014).*

(Continued)

*Primary Examiner* — S. Sough
*Assistant Examiner* — Zengpu Wei
(74) *Attorney, Agent, or Firm* — Lorenz & Kopf LLP

(57) ABSTRACT

Systems and methods are disclosed for providing a secure and assured method for updating software of a cyber-physical system (CPS) device, maintaining a CPS device, diagnosing a CPS device, and transferring of CPS data. The method may include authenticating a moment a secure maintenance device (SMD) is connected to a first device before a software-based communication is established, establishing a secure communication channel between the SMD and the first device, authenticating a user of the first device and determining access rights of the user using an identity of the first device; transmitting digitally signed updates from the SMD to the first device; receiving, at the SMD, digitally signed first data from the first device, performing diagnostic and maintenance functions at the first device, and exporting data from the first device to the SMD for mobile transfer to another platform.

17 Claims, 19 Drawing Sheets

(51) Int. Cl.
*G06F 21/32* (2013.01)
*H04L 9/32* (2006.01)
*H04L 9/40* (2022.01)

(52) U.S. Cl.
CPC .......... *H04L 63/0428* (2013.01); *H04L 63/08* (2013.01); *H04L 63/102* (2013.01); *H04L 63/166* (2013.01); *G06F 2009/45587* (2013.01)

(58) Field of Classification Search
CPC ................. H04L 63/0428; H04L 63/08; H04L 63/102; H04L 63/166
USPC ....................................................... 717/173
See application file for complete search history.

(56) References Cited

U.S. PATENT DOCUMENTS

2018/0343246 A1* 11/2018 Benayed ............... H04L 9/3226
2019/0014085 A1* 1/2019 Soliman .............. H04L 63/0263
2019/0187971 A1 6/2019 Wang et al.
2019/0312855 A1* 10/2019 Sharma ................. H04L 63/123

OTHER PUBLICATIONS

Extended European Search Report mailed Sep. 15, 2021 in European Application No. 21170012.5 (7 pages).

\* cited by examiner

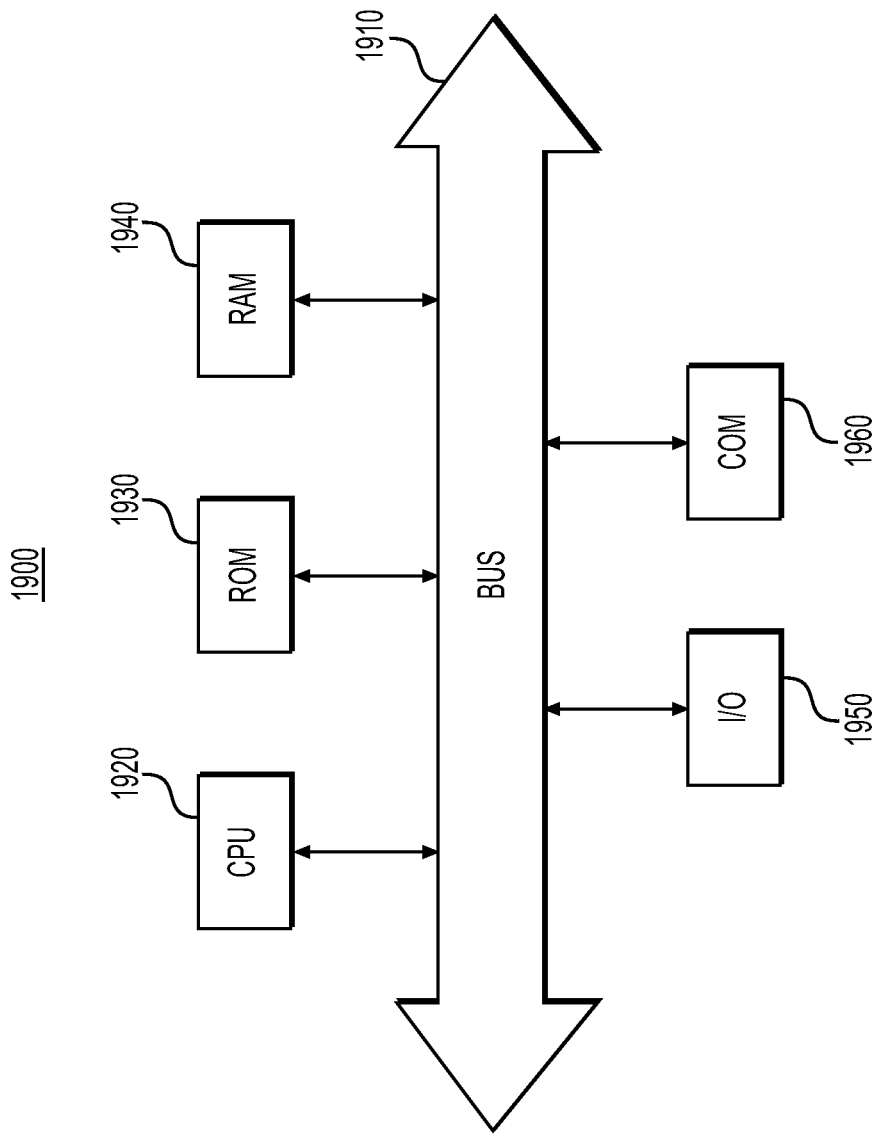

SYSTEMS AND METHODS FOR SECURE MAINTENANCE DEVICE FOR CYBER-PHYSICAL SYSTEMS

RELATED APPLICATIONS

This application claims the benefit of priority to U.S. Provisional Application No. 63/014,851 filed Apr. 24, 2020, the entirety of which is incorporated herein by reference.

TECHNICAL FIELD

Various embodiments of the present disclosure generally relate to security capabilities of cyber-physical systems (CPS), such as control systems on vehicles, ships, aircrafts, and industrial plants, etc. National Institute of Standards and Technology (NIST) defines CPS as a system that "comprise interacting digital, analog, physical, and human components engineered for function through integrated physics and logic. These systems will provide the foundation of our critical infrastructure, form the basis of emerging and future smart services, and improve our quality of life in many areas."

BACKGROUND

Cyber-physical systems (CPS) operate under an assumption that the software operating the physical aspects of a system are safe, but many of these systems were developed before the concept of cyber-crime. While there is considerable effort to improve the security of these cyber-physical systems, there is less focus on weaving security into the software as it is developed throughout its life-cycle. The result of this lack of focus is the need for expensive perimeter protection solutions.

One security solution that has shown to be effective is continual updates of the software (e.g., firmware) of the systems. Many of today's CPS (e.g., actuators, embedded control systems, controllers, avionics systems, automobiles, medical devices) have a rudimentary process for updating the firmware and configuration data. For example, it may be a port on the device that allows anyone to push any firmware/data into the systems. Thus, it could be possible for a person to turn these systems against their users, operating environment, and/or others within their spheres of influences. As such, there is a need to ensure that data moved into a CPS will not invalidate the security of the CPS, by delivering a secure and assured solution for maintaining CPS devices, diagnosing CPS devices, and transferring CPS data.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods disclosed relate to delivering a secure and assured solution for maintaining CPS devices, diagnosing CPS devices, and transferring CPS data.

A computer-implemented method is disclosed for providing a secure and assured method for updating software of a cyber-physical system (CPS) device, maintaining a CPS device, diagnosing a CPS device, and transferring of CPS data. The method may include authenticating a moment a secure maintenance device (SMD) is connected to a first device before a software-based communication is established; establishing a secure communication channel between the SMD and the first device; authenticating a user of the first device and determining access rights of the user using an identity of the first device; transmitting digitally signed updates from the SMD to the first device; receiving, at the SMD, digitally signed first data from the first device; performing diagnostic and maintenance functions at the first device; and exporting data from the first device to the SMD for mobile transfer to another platform.

A system is disclosed for securely maintaining, diagnosing, and updating a device while protecting the security assurance of the device may include: a memory storing instructions; and a processor executing the instructions to perform a process including: authenticating a moment a secure maintenance device (SMD) is connected to a first device before a software-based communication is established; establishing a secure communication channel between the SMD and the first device; authenticating a user of the first device and determining access rights of the user using an identity of the first device; transmitting digitally signed updates from the SMD to the first device; receiving, at the SMD, digitally signed first data from the first device; performing diagnostic and maintenance functions at the first device; and exporting data from the first device to the SMD for mobile transfer to another platform.

A non-transitory computer-readable medium is disclosed for storing instructions that, when executed by a processor, may cause the processor to perform a method for securely maintaining, diagnosing, and updating a device while protecting the security assurance of the device. The method may include authenticating a moment a secure maintenance device (SMD) is connected to a first device before a software-based communication is established; establishing a secure communication channel between the SMD and the first device; authenticating a user of the first device and determining access rights of the user using an identity of the first device; transmitting digitally signed updates from the SMD to the first device; receiving, at the SMD, digitally signed first data from the first device; performing diagnostic and maintenance functions at the first device; and exporting data from the first device to the SMD for mobile transfer to another platform.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 19 depicts an exemplary computer device or system, in which embodiments of the present disclosure, or portions thereof, may be implemented.

DETAILED DESCRIPTION

Figure 1:
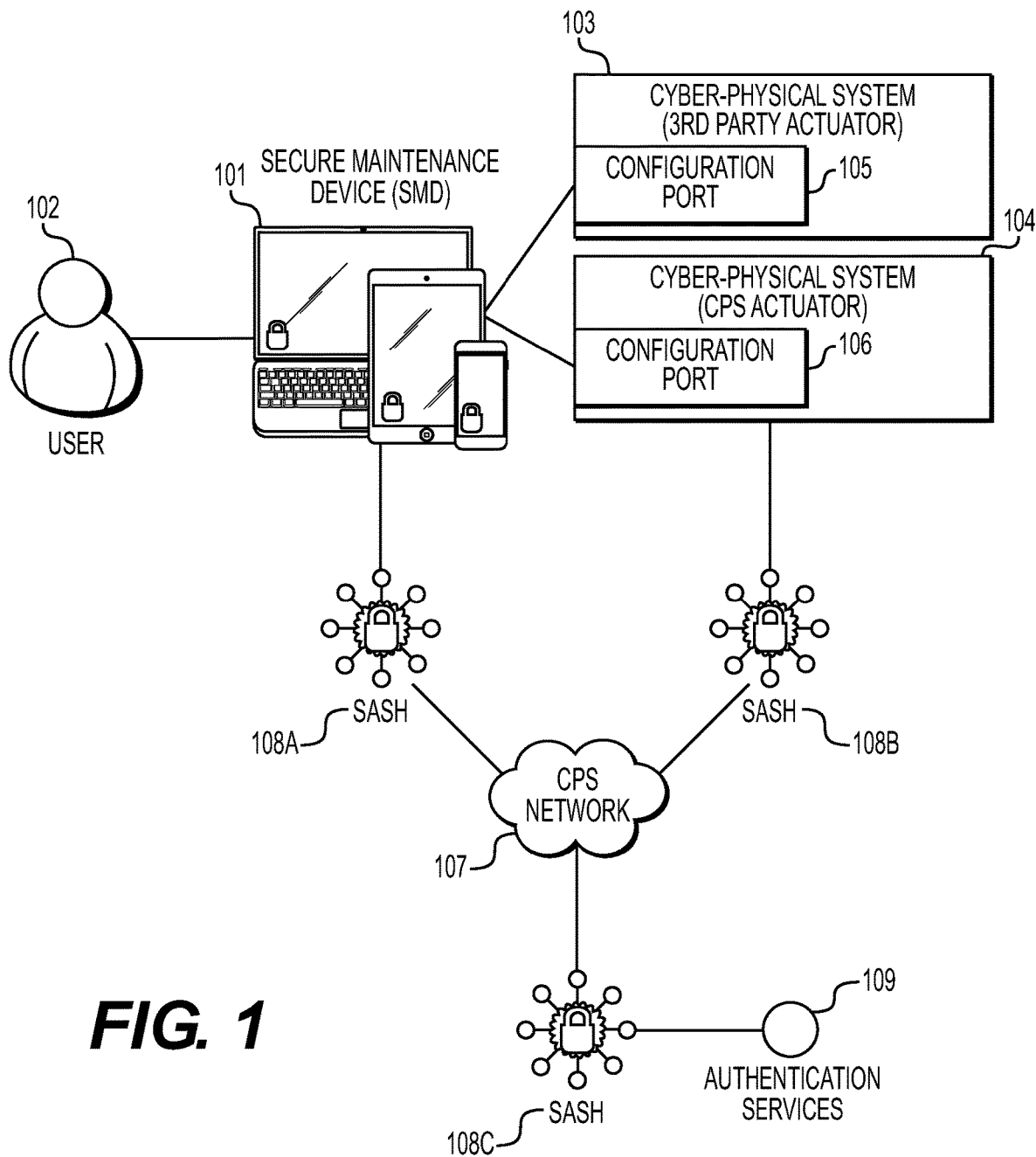
FIG. 1 depicts a diagram of a system including a secure maintenance device, according to one or more embodiments.

The following embodiments describe methods and systems for security capabilities of cyber-physical systems (CPS), such as control systems on vehicles, ships, aircrafts, and industrial plants, etc. Embodiments disclosed herein may be directed to delivering a secure and assured solution for maintaining CPS devices, diagnosing CPS devices, and transferring CPS data.

According to one or more embodiments, the present disclosure relates to one or more objectives including: assuring that the data moved into the CPS will not invalidate the security posture of the CPS; providing a trusted environment for transferring information from the CPS device to a secure location for further analysis; allowing the sensitive data to be downgraded to become available for general consumption (e.g., location and sequence of the command executed by the CPS will be removed); assuring that only the user/operator with the appropriate access will be allowed to use the system to communicate with the CPS device, thus eliminating insider threats or disgruntled employees; delivering a secure and assured solution for maintaining CPS devices, diagnosing CPS devices, and transferring CPS data; and hosting of third-party diagnostic software, thus consolidating multiple devices onto a secure maintenance device.

One or more advantages provided by the embodiments disclosed herein may include: a cross-domain solution (e.g., multiple levels of security) used as a maintenance device of the cyber-physical systems; supporting a mobile maintenance function for cyber-physical systems; providing military with improved cybersecurity assurance systems; and allowing operators to securely administer cyber-physical systems with minimal modification to existing CPS.

One or more technical benefits provided by the embodiments disclosed herein may include: certifiable and accreditable technical security Cross-Domain Solution method on a mobile device designed for software updates (e.g., firmware/data) for cyber-physical systems without invalidating the certification and accreditation for the systems; certifiable and accreditable technical security method for transferring of security-sensitive, mission-critical, and/or private data from cyber-physical systems onto a mobile device, securing the data and transferring to another environment; and certifiable and accreditable technical security method for diagnosing cyber-physical systems without introducing security vulnerabilities, threats, and risk into the systems.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

FIG. 1 depicts a diagram of a system including a secure maintenance device (SMD) 101, according to one or more embodiments. According to one or more embodiments, the SMD is any type of computing device, e.g., a mobile, wearable, and/or tablet-like apparatus that provides capabilities for a user 102 to locally administer its cyber-physical system (CPS) devices that assure its security certification and accreditation postures. The CPS devices may include a third-party actuator 103 and a CPS actuator 104. Each of the CPS devices may include a configuration port. For example, the third-party actuator may include configuration port 105 and the CPS actuator may include a configuration port 106.

According to one or more embodiments, the SMD provides one or more of the following capabilities to the end users (e.g., CPS users). The SMD may load the CPS software revisions, firmware revisions, parameter configurations, and data into the CPS device while assuring that (1) the data is secure to the level of the CPS device, and (2) assuring that the CPS device is not violated. The SMD may transfer the CPS data from the CPS device to the SMD. The SMD may protect the CPS data until the SMD is connected to a secure environment for export. Additionally, the SMD may allow the user to downgrade the data classification for export. Further, the SMD may authenticate a user and only allow the user to access the various domains based on their access rights.

In addition to the user's capabilities listed above, the SMD may provide the following additional capabilities to the CPS device and vendor supplier (e.g., third party CPS device suppliers). The SMD may perform diagnostics of the CPS device, and allow CPS administrators to diagnose the CPS.

Furthermore, the SMD allows its administrator to manage and maintain the device to ensure proper functionality. Moreover, the SMD has the capabilities to interact with a connected cyber customer Secure Over-The-Air-Update (SOTA) to allow the user to download the update package to perform a local update instead of distributed. Also, the SMD can join the CPS Network 107, by connecting to the connected cyber Secure Access Smart Hub (SASH) (e.g., 108a, 108b, 108c) to download data from the SMD to the CPS platform for further processing. Further, the SMD may connect to the Internet or the enterprise intranet to download information into the right security domains. Further, security provider may create the SMD with enough security to meet certain standards.

According to one or more embodiments, the SMD may be constructed using a combination of technologies, techniques, and methods. For example, the SMD apparatus may be constructed using a computing platform with one or more of the following: hardware virtualization technology, firmware secure boot, trusted platform module, read-only memory, random access memory, NFC wireless network, Ethernet network, USB network, touch screen, writeable table style user experience capabilities, and/or ruggedized for military use.

According to one or more embodiments, the SMD may be constructed using Type 1 virtualization technology that executes on bare metal. The virtualization technology may support the creation of multiple, e.g., at least four, virtualization machines that use the hardware virtualization technologies to assure that computing resources are abstracted for each domain and completely isolated from each domain.

According to one or more embodiments, the SMD may be constructed using a cross security domain solution that implements and enforces security policies (e.g., security models).

According to one or more embodiments, the SMD may be constructed using three security domains that are enforced by the hardware virtualization technologies: user domain, security domain, and CPS domain. In one embodiment, the user domain may authenticate access using multiple factor authentication (MFA). The user domain may work with an existing customer's authentication services 109, or it may provide a framework for selecting a certified public PKI infrastructure. Also, the SMD may enable communication with remote attestation server to assure for boot integrity. Further, the SMD contains interfaces and infrastructure to interact with the user. All users may be placed into this domain when they log into the SMD. Those users with access to the CPS domain may see the CPS domain and have the authority to interact with the CPS domain, while they are kept separated. Security domain may contain all security-related data and function, which may include security audit logs. CPS domain contains all the data and function as it is related to the CPS device, which may include upload of firmware and data; transfer of data from/to the CPS device; protect the CPS data; execute diagnostic of the systems.

According to one or more embodiments, the SMD may be constructed using a framework to create a secure and trust domain to interact with third-party CPS devices, to allow the customer to use a single device to administer multiple systems. The SMD may be constructed using network capabilities to download CPS update bundle when it is within proximity of the server that contains the data (e.g., SOTA). Also, the SMD may be constructed using an Ethernet-based connection to allow the SMD to connect to the CPS Network (e.g., SASH). According to one or more embodiments, the SMD may be constructed using flexible user experiences that allow the user to select from a traditional laptop- or tablet-like user experience. Finally, according to one or more embodiments, the SMD may be constructed using ruggedize to support military hardening for deployment requirements.

The specifics of how to build the SMD, according to one or more embodiments, is provided below. For example, the system architecture description (SAD) for the SMD is provided below. It should be understood that the SMD is not restricted to the SAD provided below and that there may be variations to the SAD in alternative embodiments. The below section describes the system architecture description (SAD) for the Security Maintenance Device (SMD).

As described above, the objectives of the specification of the SMD may be to: provide a system architecture of the SMD, including the various perspectives (context, system, hardware, software, data, security, interface, dynamic behavior, and deployment) for selecting implementation technology (make vs. buy decision) and development; and/or to formally capture the SMD architecture. Thus, the SMD specification may include one or more of the following: capabilities highlight, system architecture overview, system interface view, physical view, logical view, data view, security view, dynamic behavior view, and/or deployment view.

The capabilities highlight may provide a summary of the SMD capabilities. The capabilities highlight includes a context diagram that depicts its relationship with the external systems in the CPS deployment environment. The Secure Maintenance Device (SMD) may be a tablet-like apparatus that provides the capabilities for the user to locally administers its Cyber-Physical Systems (CPS) devices that assure its security certification and accreditation postures.

Figure 2:
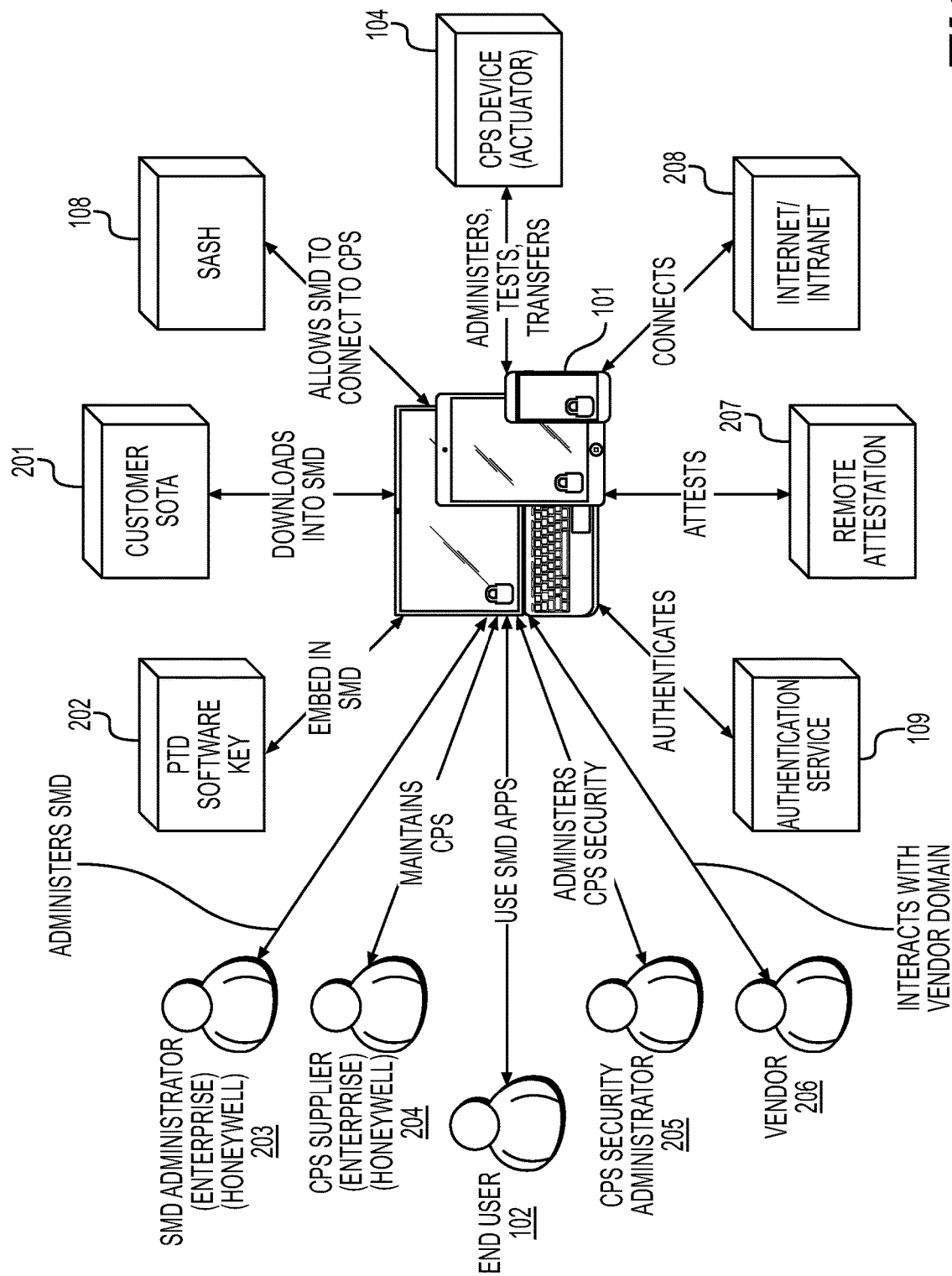
FIG. 2 depicts an example SMD context view including SMD customers and external systems, according to one or more embodiments.

FIG. 2 depicts a SMD context view including SMD customers and external systems, according to one or more embodiments. FIG. 2 identifies the users that the SMD supports, and the external systems that interact with the SMD to enable its capabilities, according to one or more embodiments. For example, as illustrated in FIG. 2, the SMD 101 may communicate with end users 102, CPS device 104, SASH 108, authentication service 109, customer SOTA 201, Port Tamper Detector (PTD) software key 202, SMD administrator 203, CPS supplier 204, CPS security administrator 205, vendor 206, remote attestation 207, and/or internet/intranet 208.

The SMD may provide several capabilities to the end users 102 (e.g., CPS Users). For example, the SMD may load the CPS software revisions, firmware revisions, parameter configurations, and/or data into the CPS device while assuring that the (1) data is secure to the level of the CPS device, and (2) assuring that the CPS device is not violated. The SMD may transfer the CPS data from the CPS device to the SMD. The SMD may protect the CPS data until the SMD is connected to a secure environment for export; additionally, the SMD allows the user to downgrade the data classification for export. The SMD may authenticate user and only allow the user to access the various domains based on its access rights.

In addition to the user's capabilities described above, the SMD provides additional capabilities to the CPS device supplier (e.g., CPS) and Vendor Supplier (3rd Party CPS device Suppliers), such as performing diagnostics of the CPS device; allowing the CPS administrators to diagnose the CPS.

Further, the SMD allows its administrator to manage and maintain the device to ensure proper functionality. Moreover, the SMD has the capabilities to interact with the Security Provider's Connected Cyber Customer Secure Over-The-Air-Update (e.g., customer SOTA) to allow the user to download the update package to perform a local update instead of distributed. Also, the SMD has the capability to join the CPS Network, by connecting to the connected cyber SASH to download data from the SMD to the CPS platform for further processing. The SMD can also be connected to the Internet or the Enterprise Intranet to download information into the right security domains. Additionally, Security Provider creates the SMD with enough security to meet certain standards.

The system architecture overview describes the system architecture. It shows the major subsystems of the SMD and its relationships among the subsystems and external systems. The Secure Maintenance Device (SMD) is a tablet-like apparatus that allows the customer to administer, diagnose, and manage the Cyber-Physical System (CPS) Devices to realize the capabilities highlights described above.

SMD may integrate the following capabilities into a single mobile apparatus that serves as a maintenance device for cyber-physical systems: cross-domain solution (CDS) (e.g., data transfer across security domains in accordance with security models); domain isolation (e.g., each CPS data, SMD security data, and SMD are all individually segregated); data encryption (e.g., data are stored encrypted); digital signature (e.g., data are digitally signed before the transfer); IPSec Communication (e.g., transport mechanism is encrypted); NIST 800-53 (e.g., apparatus is secure according to NIST security requirements); and/or anti-tamper (e.g., apparatus is physically secured from physical attacks).

The SMD is designed with the components to assure that it meets the military, regulated, and/or commercial use. To realize the SMD capabilities, additional software may be added to CPS to intercept and process the commands. The components/subsystems to realize these capabilities are depicted in FIG. 2. The components of the SMD and the external systems interacting with the SMD are described in the subsections below.

The system interface view provides the SMD framework, which allows the vendor to instantiate addition domains to interact with other CPS devices; thus, allowing the user to use one maintenance device to service multiple CPS devices. The physical view describes the hardware architecture of the SMD. The logical view describes the software architecture of the SMD and their relationships. The data view identifies the major data that are used, created, and managed by the SMD. The security view illustrates the security protection boundary, the security measures, how they meet the security requirements, and what threats/risk they are assuring. The dynamic behavior view outlines the dynamic behaviors of the steps, i.e., it describes the flow through the SMD. The deployment view describes the deployment of the SMD onto the CPS deployment environment.

As shown in FIG. 2, according to one or more embodiments, the Secure Maintenance Software component contains the software for the Security Maintenance Device. Additionally, the Secure Maintenance Hardware component contains the hardware components that make up the Security Maintenance Device.

Figure 3:
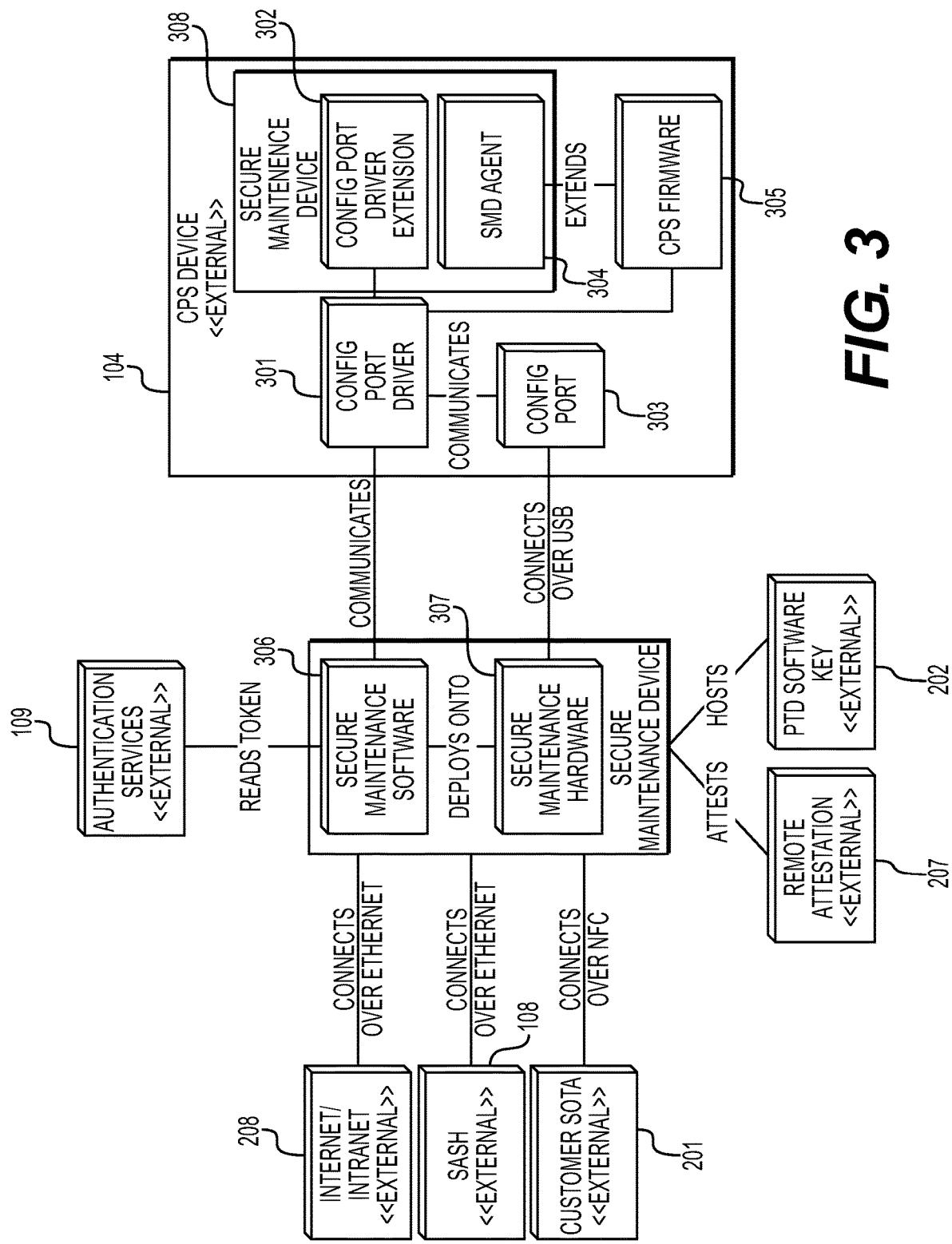
FIG. 3 depicts an example SMD system view including SMD subsystems and their relationships, according to one or more embodiments.

FIG. 3 depicts a SMD system view including SMD subsystems and their relationships, according to one or more embodiments. As illustrated in FIG. 3, the SMD system may include SMD 309 (e.g., SMD subsystem), CPS device 104, authentication services 109, SASH 108, customer SOTA 201, Internet/Intranet 208, remote attestation 207, and/or PTD software key 202. The SMD 309 may include secure maintenance software 306 and secure maintenance hardware 307. The CPS device 104 may include a configuration port driver 301, a configuration port 303, CPS firmware 305, and SMD 308.

CPS device modification is described below with respect to FIG. 3. According to one or more embodiments, the CPS configuration port device driver 301 and firmware 305 will be enhanced to accommodate the SMD 308. The configuration port driver extension 302 is an enhancement to the driver to encrypt and/or decrypt commands to or from the SMD 308. Also, the configuration port driver extension intercepts SMD-specific commands and routes to the SMD agent 304. The SMD agent 304 is additional software that processes commands from the SMD and performs the necessary actions.

The SMD 308 is designed to enable the CPS device 104 to select the authentication service 109. If an authentication service 109 is not selected, then the SMD 308 uses a certified public PKI managed service to provide MFA authentication service. The SMD is further designed to administer the CPS device, and the administration capabilities are described above.

According to one or more embodiments, the SMD 308 uses its wireless receiver to connect to the customer SOTA 201 to transfer CPS device firmware 305 and/or configuration data to the SMD. This capability allows the customer to update the CPS device firmware and/or configuration locally.

According to one or more embodiments, the SMD 101 uses the SASH 108 to connect to the CPS device and other connected cyber technology capabilities (e.g., administration of the SMD and transfer of the security audit logs). Remote attestation 207 may refer to a trusted server that can objectively assess the health of the SMD. The SMD can communicate with the Internet and/or Intranet 208 to allow the user to download and/or upload information into and/or from the untrusted and/or unclassified domain. Although SMD may not provide an interface, it does provide a framework to configure the SMD to administer other vendor's CPS devices.

Figure 4:
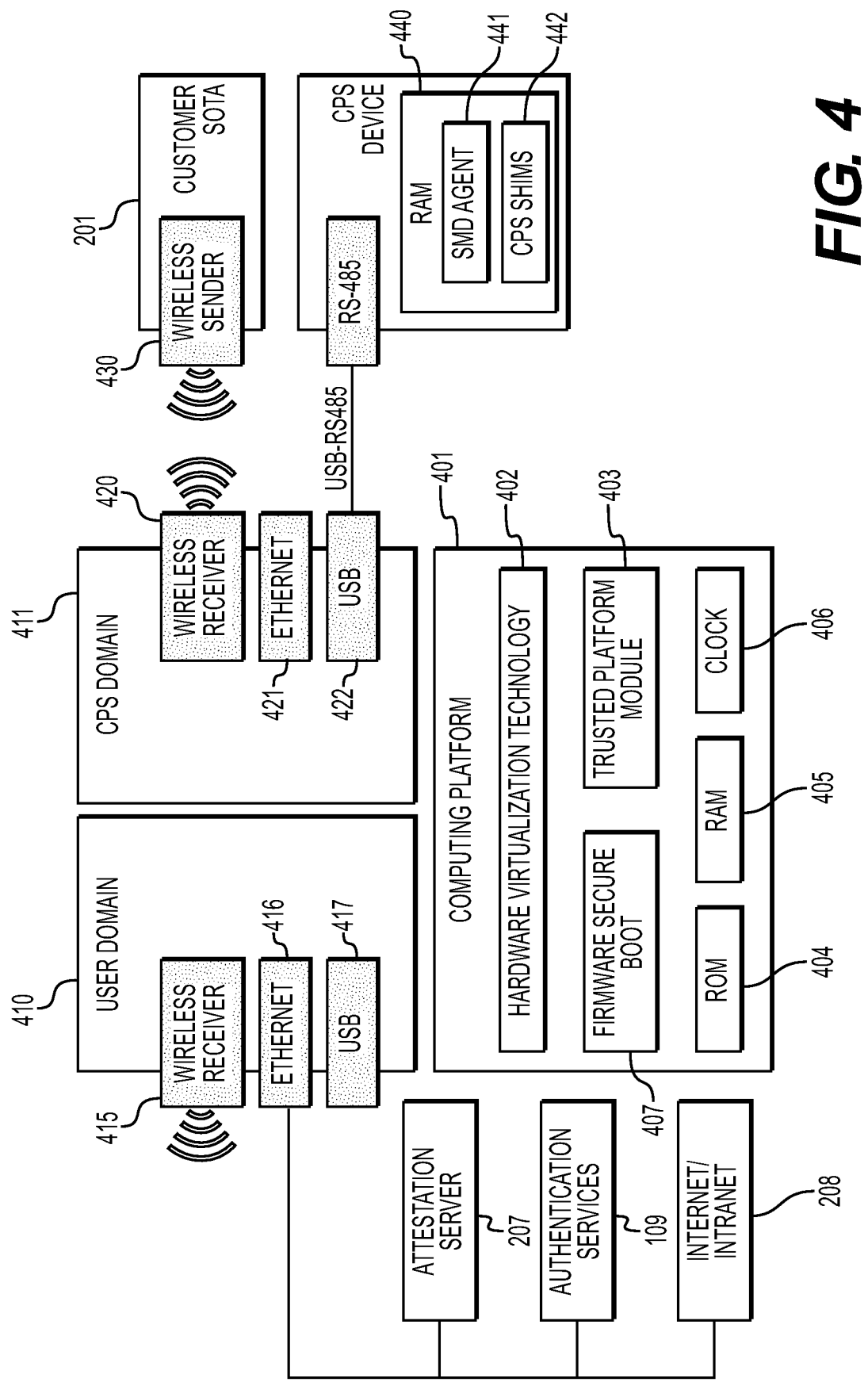
FIG. 4 depicts an example SMD Hardware View including a security component of the tablet platform, according to one or more embodiments.

FIG. 4 depicts a SMD Hardware View including a security component of the tablet platform, according to one or more embodiments. According to one or more embodiments, the SMD may be constructed using three security domains that are enforced by the hardware virtualization technologies: user domain 410, security domain, and CPS domain 411. User domain 410 may authenticate access using multiple factor authentication (MFA). The user domain 410 may work with an existing customer's authentication services 109, or it may provide a framework for selecting a certified public PKI infrastructure. Also, the SMD may enable communication with remote attestation server 207 to assure for boot integrity. Further, the SMD contains interfaces and infrastructure to interact with the user. All users may be placed into this domain when they log into the SMD. Those users with access to the CPS domain 411 may see the CPS domain 411 and have the authority to interact with the CPS domain 411, while they are kept separated. Security domain may contain all security-related data and function, which may include security audit logs. CPS domain 411 contains all the data and function as it is related to the CPS device 104, which may include upload of firmware and data; transfer of data from/to the CPS device; protect the CPS data; execute diagnostic of the systems. The SMD software is designed to deploy on any computing platform 401 that supports at least the following capabilities: hardware virtualization technology 402, trusted platform module 403, read-only memory (ROM) 404, random-access memory (RAM) 405, clock 406, and/or firmware secure boot 407.

The Hardware virtualization technology 402 may provide hardware assistance in abstracting the hardware computing resources from the software to create isolated security domains to protect the CPS from the untrusted environment.

The Trusted Platform Module 403 may be a secure crypto-processor that assists with generating, storing, and limiting the use of cryptographic keys to booting modules, attestation, and Security Provider's Connected Cyber Port Tamper Detector (PTD).

The ROM 404 may include sufficient memory to host the SMD Agent and extension of the Configuration Port Device Driver. The actual number is to be determined to show the code is written, but it is not established to be large. The RAM 405 may include sufficient memory to log security events for the SMD activities. The clock may provide accurate time for security event time-stamp.

The SMD hardware platform supports wireless and wired connections. Specifically, the SMD is enabled with NFC, Ethernet, and USB for network connections. The USB (through a USB to RS-485 cable) may be used to communicate with the CPS Configuration Port to administer, tests, and transfer data to/from the CPS device. The NFC is primarily designed to enable for update package transfer from the customer SOTA to the SMD to support local updates. Finally, the Ethernet is targeted for connection to the SASH to support large data transfer to/from the SMD. The CPS device 104 may include additional RAM 440 to accommodate for the SMD Agent 441 and the CPS Shims 442 in the CPS Configuration Port Device Driver 301. The SMD may meet the trusted path security requirement by rooting its trust in the hardware; specifically, the Trusted Platform Module (TPM) 403.

Figure 5:
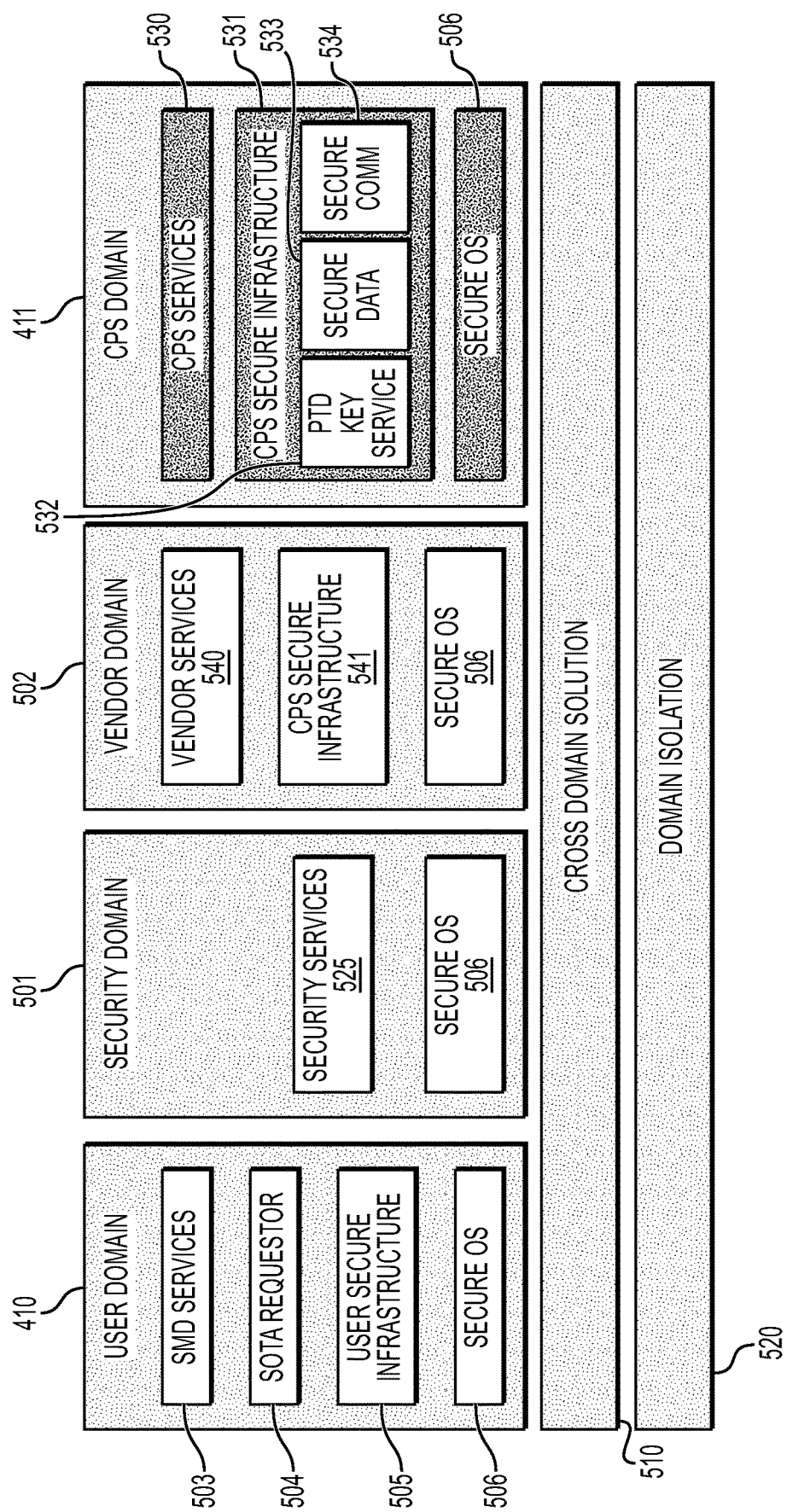
FIG. 5 depicts an example SMD logical view including SMD software components and their relationships, according to one or more embodiments.

FIG. 5 depicts a SMD Logical view including SMD software components and their relationships, according to one or more embodiments. The SMD contains two major subsystems: one subsystem is deployed onto a general-purpose tablet (e.g., SMD 101), and the other is an enhancement to the CPS Controller (e.g., SMD-CPS 308).

The SMD 308 subsystem may include the following components: SMD domains (e.g., user domain 410, security domain 501, vendor domain 502, and/or CPS domain 411), cross-domain solution 510, and/or domain isolation 520.

The SMD-CPS 308 subsystem may include two components which enhance the CPS to assure all updates, diagnoses, and transfers: SMD Agent 441 and the CPS Shims 442.

The domain isolation 520 provides a mechanism to create domains that are completely isolated from each other. Domain isolation 520 uses the Hardware Virtualization Technology 402 to assure that computing resources are abstracted for each domain. The Domain Isolation 520 is realized using a Type 1 Hypervisor.

In addition, SMD provides a framework that can be used to create a Vendor Domain that allows the user to administer additional CPS within the user computing platform. For example, within the CPS platform, the user can use one SMD 101 to administer a CPS actuator. Additionally, other vendor-provided CPS devices may be used.

According to one or more embodiments, the SMD 101 uses the cross-domain solution 510 to transfer data from the user domain 410 to the CPS domain 411 or from the user domain 411 to the vendor domain 502; thus, supporting data transfer from untrusted domain to trusted domain or from a lower security domain classification to a higher security domain classification. This component implements and enforces security policies, according to security models. Specifically, the cross-domain solution 510 implements the following security policies: filtering (e.g., eliminating data based on pre-defined criteria (e.g., data type, classification), keyword search (e.g., searching for "dirty words," "clean words" capability emerging), integrity checks (e.g., verifying that data has not been modified), transliteration (e.g., reformatting data), sanitization (e.g., removing or editing sensitive data, so that resulting data is less sensitive), regrading (e.g., changes to sensitivity labels (i.e., classification and caveats)), malicious code checks (e.g., checking for the presence of viruses), and/or cleaning (e.g., removing background data, removing active content, removing malicious content).

According to one or more embodiments, the SMD may use Mandatory Access Control (MAC) to implement these policies.

According to one or more embodiments, the SMD 101 has three domains (e.g., user domain 410, security domain 501, and CPS domain 411) with a framework to configure for a vendor domain(s) 502 to allow the customer to use one secure maintenance device to locally administer, diagnose, and transfer CPS devices within a given platform. The design of these domains is elaborated in the following subsections.

According to one or more embodiments, the CPS domain 411 is a secure domain at the same security level as the CPS device. The CPS domain 411 uses a secure OS 506 that supports a trusted path and Mandatory Access Control policy definition and enactment as described above. The Secure OS 506 is used to define and enact Mandatory Access Control policies require communicating with the user domain 410.

As described above, the CPS domain 411 is enabled with wireless, wired, and other connections. Communication with CPS device will depend on the configuration port capabilities. In the case of CPS actuator, communication is accomplished via the USB port is used to communicate with the CPS device via the RS-485 port. Security Provider has developed a special cable to convert USB to RS-485 for this communication. For communication with the CPS Platform Host to transfer CPS domain 411, the CPS domain 411 perform service-to-service authentication using machine identities (e.g., Media Access Control address) prior to initiating the data transfer. CPS domain 411 only communicates with CPS Platform Host that is at the same security level as the CPS domain 411.

According to one or more embodiments, the CPS domain 411 may include a CPS secure infrastructure 531 that encrypts and decrypts all communication with the CPS device 104 using its "Secure Data" service 533 and secure communications component 534. Additionally, the CPS domain 411 houses the Port Tampering Detection (PTD) software key service 532, which will be able to retrieve its key and send to the CPS device 104 once the cable is connected to the CPS device. The PTD sends the software key prior to any data packet. Once the CPS device port is opened, the CPS domain 411 transfers control to the "CPS Services" component 530. The "CPS Services" component 530 handle the specifics of the CPS services such as uploading firmware/data, performing diagnostics, and transferring data.

According to one or more embodiments, the Security Domain 501 may be a privileged domain that contains SMD-related security data and function (e.g., security services 525). Only the SMD Security Operator can access this domain. Otherwise, this domain received security audit events from the other domains and recorded them accordingly. This domain may require a Secure OS 506 to assure that only specific processes and/or functions may access this domain. This may be enforced by the Mandatory Access Control security policies.

According to one or more embodiments, The user domain includes SMD services 503, SOTA requestor 504, user secure infrastructure 505, and secure OS 506. The user domain 410 is the domain that interacts with the external world and users except for when it communicates with the CPS domain 411 and CPS Platform Host. This includes communication with the Authentication Service 109 and the Remote Attestation Server 207. Access to the other domains is control through the security policies for cross-domain. From the user domain, the user is authorized according to the security polices with the other domains.

According to one or more embodiments, the User Domain contains the services to communicate with the Security Provider's technologies (e.g., SOTA and SASH) to transfer software/data (e.g., firmware updates). These communication services can only proceed if the User Domain successfully authenticates with the Security Provider's technology. One of the service-to-service authentication methods is to use Media Access Control address as identity. SMD is experimenting with other approaches (e.g., PTD keys) to provide additional options.

According to one or more embodiments, the vendor domain 502 may not be used by default. It may be created after a customer requests to enable the SMD to support other CPS devices within the CPS deployment environment. The vendor domain 502 may include vendor services 540, CPS secure infrastructure 541, and/or secure OS 506.

Figure 6:
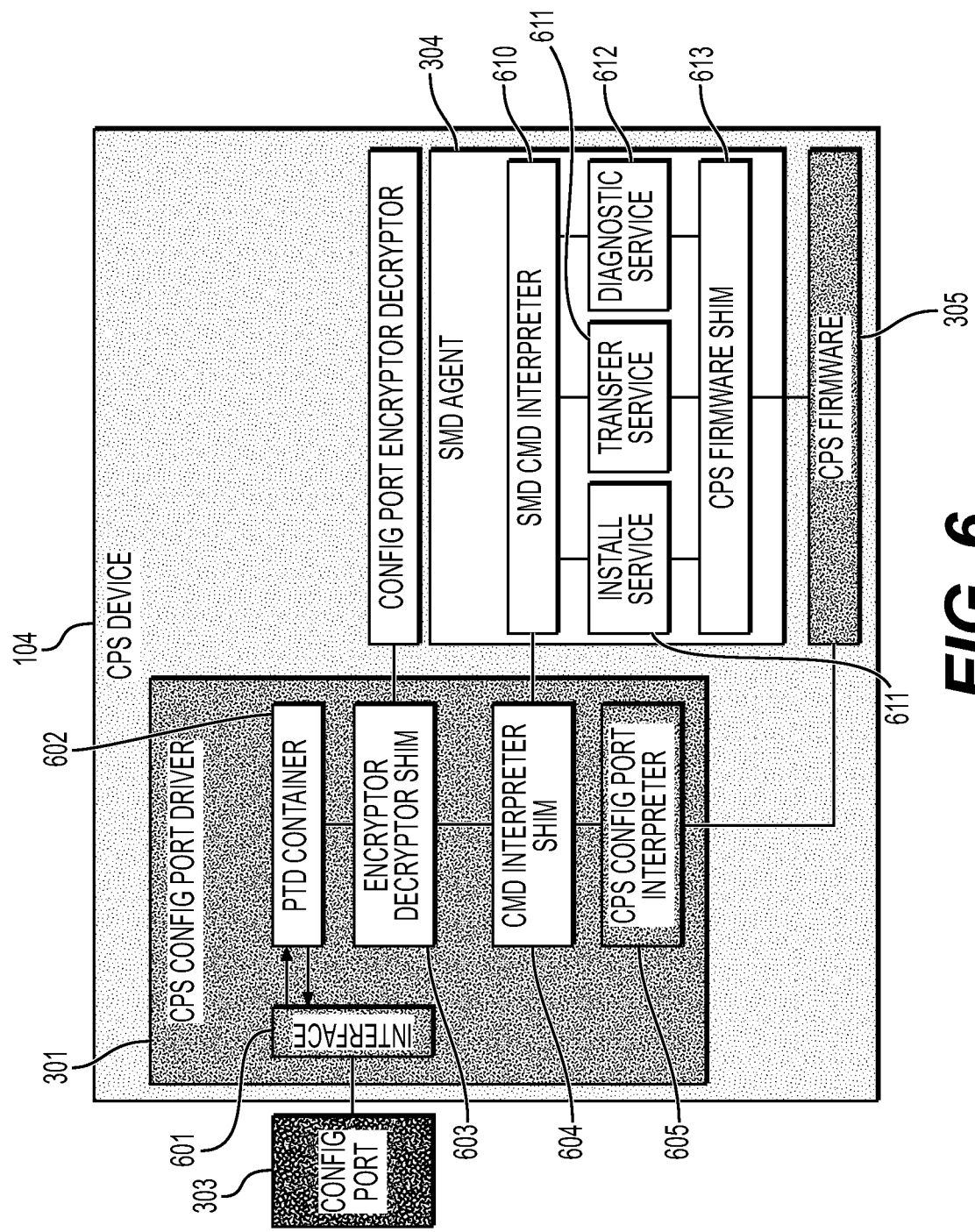
FIG. 6 depicts an example SMD-CPS logical view including SMD-CPS software enhancements to the CPS Controller, according to one or more embodiments.

FIG. 6 depicts a SMD-CPS logical view including SMD-CPS software enhancements to the CPS Controller, according to one or more embodiments. As illustrated in FIG. 6, PTD container 602 may communicate with an interface 601, which communicates with configuration port 303. The SMD-CPS Shims is an enhancement to the CPS Configuration Port Device Driver 301 to intercept the SMD traffic and route to the SMD Agent for process. This may be accomplished using a configuration port encryptor decryptor shim 603 and/or a SMD CMD (command) interpreter shim 604. The encryptor decryptor shim 603 encrypts or decrypts the data before it is sent to the SMD CMD interpreter shim 604 to determine if the command is for the SMD agent 304. If the command is not for the SMD agent 304, it is passed to the existing CPS Control. If it is for the SMD agent 304, it is sent to the SMD agent 304. The SMD agent 304 may include an SMD CMD interpreter 610, install service component 611, transfer service component 611, diagnostic service component 612, and/or CPS firmware shim 613.

According to one or more embodiments, the SMD Agent 304 is an extension to the current CPS Controller firmware 305 to perform the following functions: receiving updated firmware and/or data from the SMD tablet; enabling the SMD operator to update the firmware and/or data; allowing the SMD operator to transfer firmware and/or data to the SMD tablet; and/or permitting the SMD operator to execute diagnostics.

Figure 7:
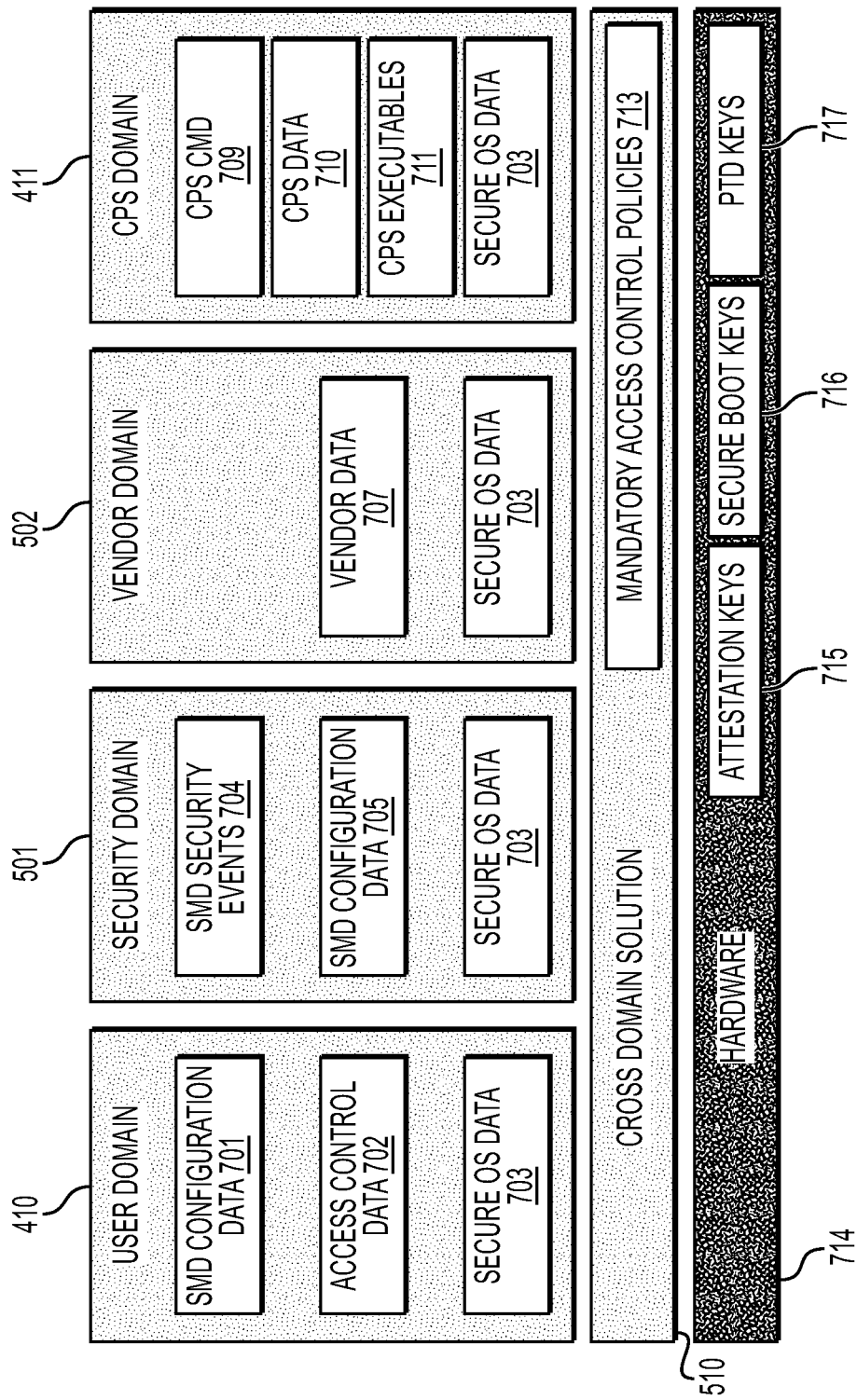
FIG. 7 depicts an example SMD data view including SMD data classified in accordance with its components, according to one or more embodiments.
Figure 8:
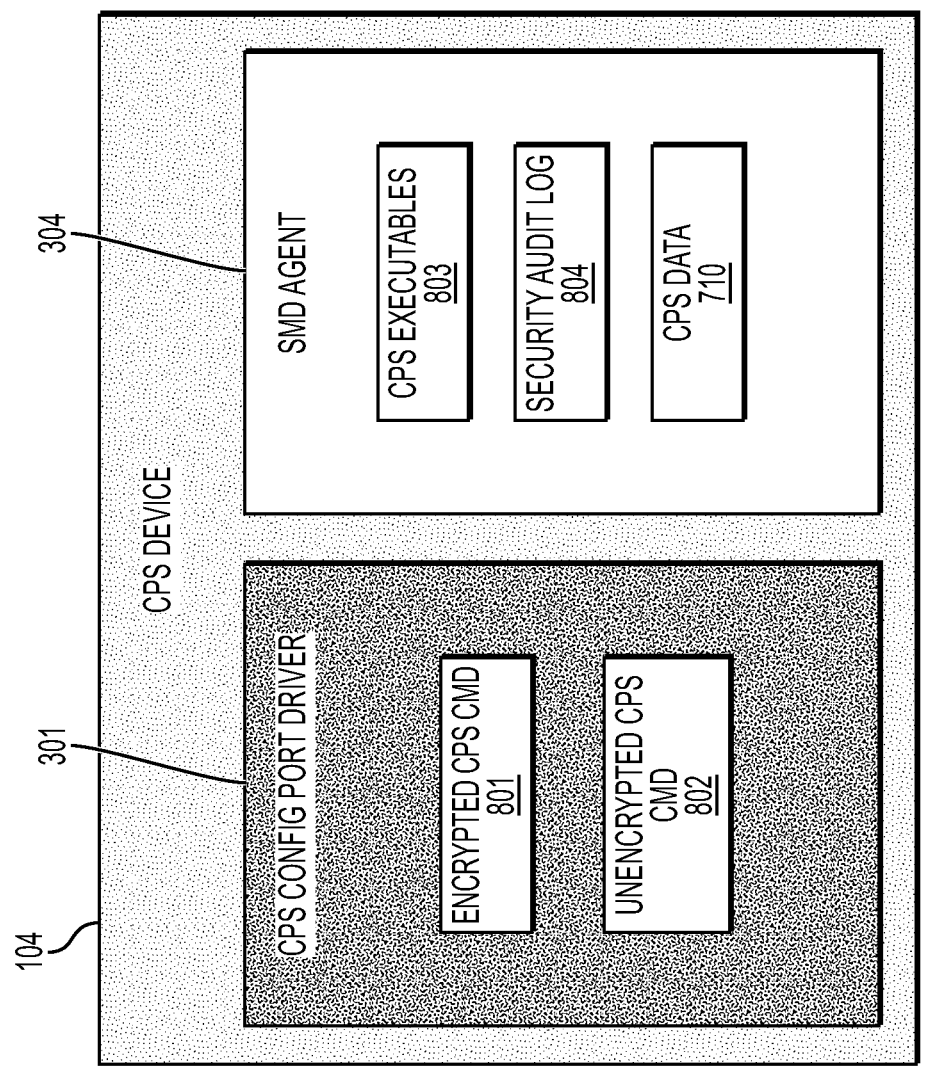
FIG. 8 depicts an example SMD-CPS data view including SMD data classified in accordance with its components, according to one or more embodiments.

FIG. 7 depicts a SMD Data View including SMD data classified in accordance with its components, according to one or more embodiments. FIG. 8 depicts a SMD-CPS data view including SMD data classified in accordance with its components, according to one or more embodiments. The data in FIG. 7 represents the data in the SMD tablet; whereas, FIG. 8 shows the data in the CPS device.

According to one or more embodiments, the SMD 101 may include SMD tablet (e.g., hardware 714), which houses the root of trust key 716 for secure boot, the attestation keys 715, and the PTD Software Keys 717 in its trusted platform module 403. The PTD Software Keys 717 provides when the PTD deploys its keys, most likely at the manufacture. The keys stored in the SMD software may conform to the trusted platform module 403 of the selected tablet solution. The SMD 101 has security policies that enforce access across the various domains according to the cross-domain defined and managed by the Secure OS 506.

According to one or more embodiments, the SMD CPS domain 411 and the SMD Agent 304 contain and manage CPS firmware/data 710. For example, CPS domain 411 may include CPS CMD 709, CPS data 710, CPS executables 711, and secure OS data 703. SMD CPS domain 411 may include the data necessary to maintain and execute the module. It may be the only domain that touches the CPS firmware/data at the security level of the CPS device.

According to one or more embodiments, the SMD user domain 410 contains SMD user-specific data. For example, the user domain 410 may include SMD configuration data 701, access control data 702, and secure OS data 703. This domain also contains the initial CPS firmware/data until it is processed through the cross-domain solution service to transfer to the CPS domain 411. This includes the CPS firmware/data from SOTA or the internet.

According to one or more embodiments, the SMD Security Domain contains security-related data such as access control and security audit logs. For example, security domain data may include SMD security events 704, SMD security configuration data 705, and secure OS data 703. Only the security administrator may access and administer these data within this domain.

According to one or more embodiments, the SMD isolates vendor-specific data to vendor domain 502. The vendor domain may include vendor data 707 and secure OS data 703. The other domain does not have access to this domain. The purpose of the vendor domain 502 to isolate may be to provide privacy to the vendor CPS devices; concurrently, allowing Security Provider's CPS customers to use a single maintenance device for all their CPS devices in their deployment environment.

The SMD may encrypt all SMD commands prior to transmitting. For example, the PTD Software Keys 717 may be encrypted. The PTD may be able to encrypt its keys accordance to the SMD encryption protocol. The CPS CMD Shim may encrypt and decrypt the SMD commands accordingly.

According to one or more embodiments, the SMD Tablet and the SMD-CPS subsystem are secure and assure, according to, e.g., NIST SP 8000/53, NIST RMF, etc.

FIG. 8 depicts a SMD-CPS data view including SMD data classified in accordance with its components, according to one or more embodiments. As illustrated in FIG. 8, the CPS device 104 may include the cps configuration port driver 301 and the SMD agent 304. The cps configuration port driver 301 may include an encrypted CPS CMD 801 and an unencrypted CPS CMD 802. The SMD agent 304 may include CPS executables 803, security audit logs 804, and CPS data 710. All security-relevant event may be logged into the Security Audit Log 804 managed by the Security Domain 501. The Security Domain 501 uses the computing platform clock for time-stamp.

Figure 9:
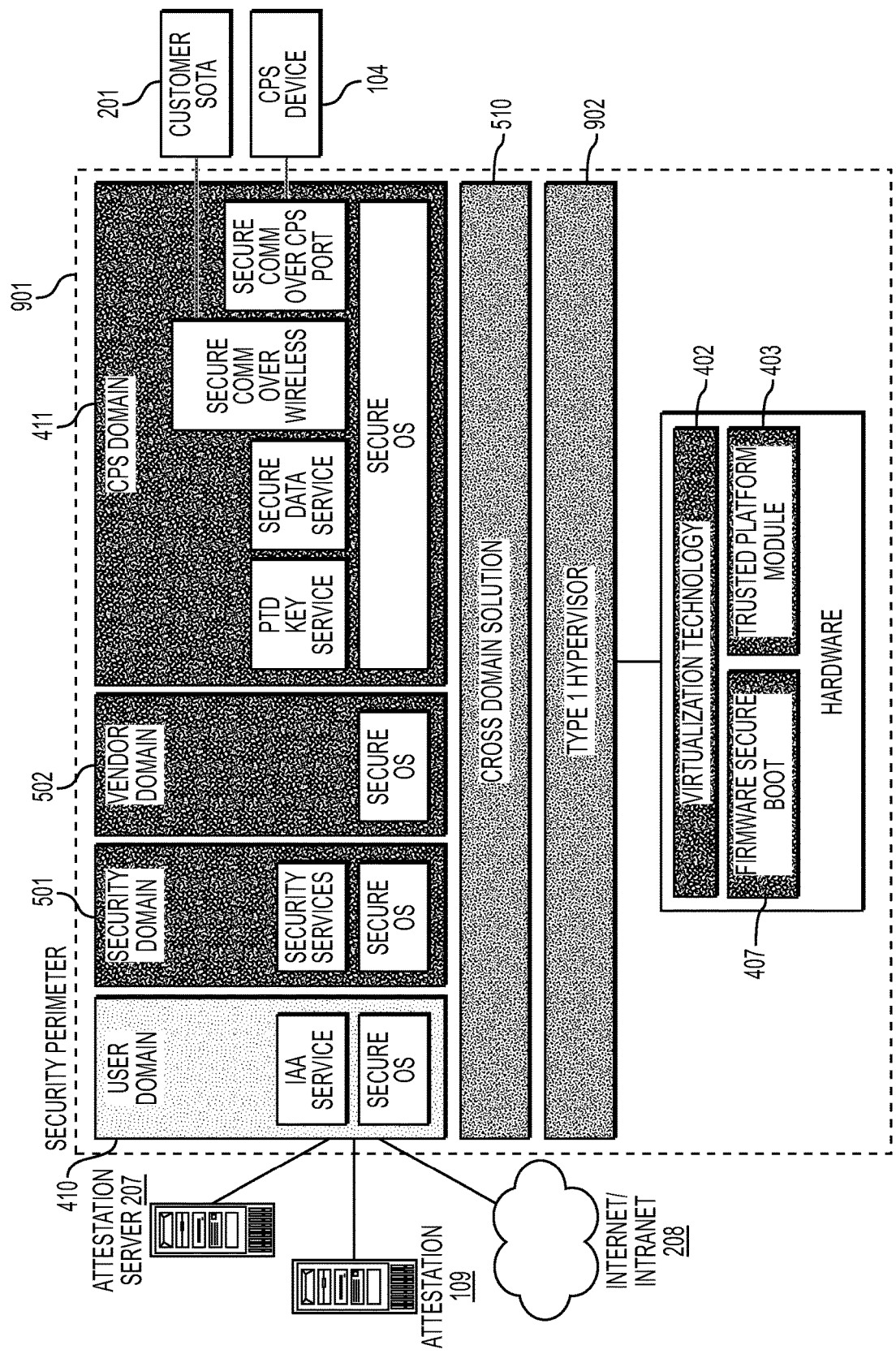
FIG. 9 depicts an example SMD security view including SMD assets and security objectives, according to one or more embodiments.
Figure 10:
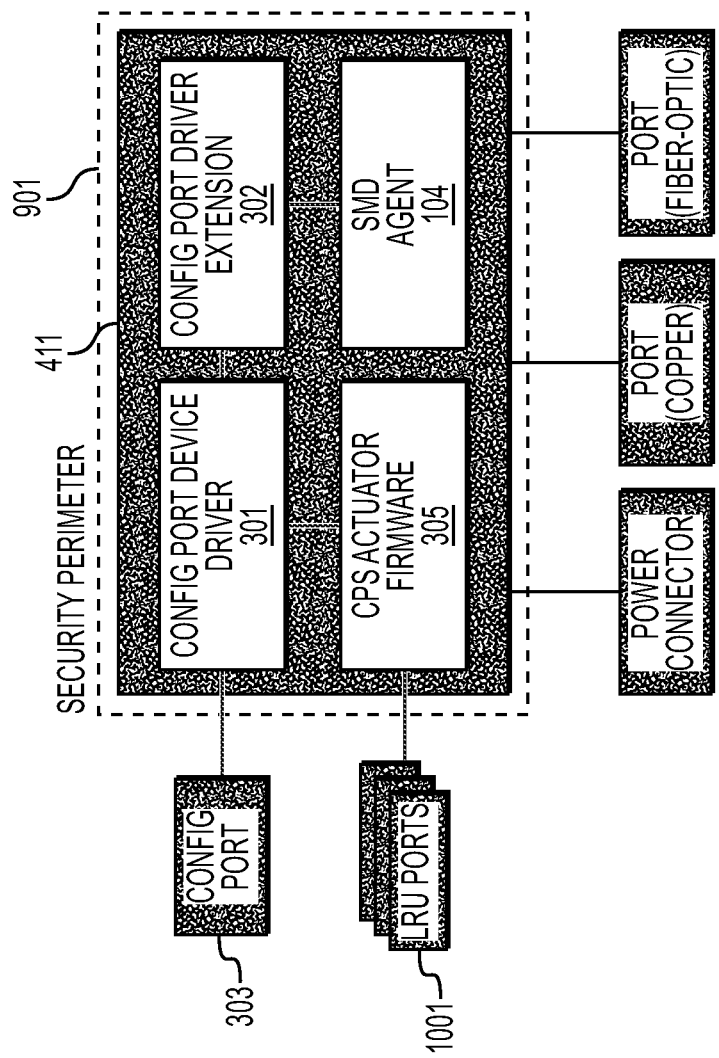
FIG. 10 depicts an example SMD-CPS security view including SMD-CPS assets and security objectives, according to one or more embodiments.

According to one or more embodiments, the security assurance applies to assets inside the security perimeter 901 depicted in FIGS. 9 and 10. The security protections are described below.

FIG. 9 depicts a SMD security view including SMD assets and security objectives, according to one or more embodiments. The SMD 101 meets the trusted path security requirement by rooting its trust in the hardware; specifically, the Trusted Platform Module (TPM) 403. Virtualization technology 402 may be communicate with a Type 1 Hypervisor 902.

FIG. 10 depicts a SMD-CPS security view including SMD-CPS assets and security objectives, according to one or more embodiments. The CPS actuator 104 may include configuration port device driver 301, configuration port driver extension 302, CPS actuator firmware 305, and SMD agent 104. The CPS actuator 104 may connect to line-replaceable unit (LRU) ports 1001, a power connector, copper port, and/or fiber-optic ports.

According to one or more embodiments, the SMD 101 may meet the integrity and authenticity requirements by assuring that it is booted to the trusted operating system by using the hardware Secure Boot feature. Before the kernel module is launched, the bootloader measures the various kernel modules and authenticates using Remote Attestation supported by the hardware and operating system boot process. The last step of the boot process may be to check for malware. When the operating systems (in the various domains) are booted, it is ready to authenticate users. Access is controlled using Discretionary Access Control and Mandatory Access Control.

According to one or more embodiments, the SMD 101 protects user access by enabling for MFA. SMD is designed to use the CPS deployment environment Authentication Services to provide a homogeneity and single sign-on solution. However, if the CPS does not have an Authentication Services, SMD 101 may provide a framework for selecting and deploying an authentication service for all the CPS security solution. Furthermore, the SMD provide a configurable option of disabling any user once it exceeds its allowable attempt.

According to one or more embodiments, the SMD 101 protects access to/from other services (e.g., SOTA 201 and SASH 108) using service authentication (e.g., Media Access Control address). Furthermore, the SMD will not connect to any services that are not on its whitelist. After it exceeds the allow attempts (specify in the configuration), the SMD will move the service of the whitelist and stop any further authentication attempts.

According to one or more embodiments, the SMD 101 uses security policies to protect SMD domain to domain communication. The security policies are defined and enforced by the Cross-Domain Solution 510 as described above. All communication with all the SMD domain is secure using IPSec and/or NIST. All data in transit and at rest are encrypted using a cryptographic algorithm for encrypting defense data, and NIST approved for commercial deployment. All security-relevant events are logged into the Security Audit Log managed by the Security Domain. The Security Domain uses the computing platform clock for a time-stamp.

According to one or more embodiments, the SMD 101 may exist in the following states: install/configure; shutdown; login; and/or logoff. The SMD Domain is only active when the SMD is in login mode. The CPS domain 411 can only transfer data to the CPS device when it receives all the CPS data. If the connection is broken, the CPS domain 411 will complete any in-progress command, purge the transmitted buffer, and terminate the transfer. The user domain 410 can only transfer the data to the CPS domain 411 once the SMD is in active mode. If the transfer is incomplete, the receiving SMD in the CPS domain 411 will purge its buffer and stop the transmission.

According to one or more embodiments, the SMD 101 has two-part components: the standalone tablet, and a small software (SMD Receiver) to receive the SMD data and deploy into the CPS device. The SMD Receiver will not distribute the CPS Data to the CPS controller until it has received the complete package. The SMD Receiver will purge its collecting CPS Data if the SMD Receiver reaches its timeout parameter. This parameter is set when the SMD Receiver is in the install/configure state.

According to one or more embodiments, the SMD can be connected to the customer SOTA 201 to download CPS data package, and/or it can be connected to the CPS Network (via the SASH 108) to transfer data to the environment platform.

Described below are some considerations for deployment, design, implementation, and/or security certifications. The SMD Software can operate on any tablet as long as it meets the security requirements specified for the hardware platform; as well, as the supporting infrastructure for interaction with the external systems. For the SMD, the appropriate computing platform may be suggested for the tablet to house the SMD software.

The description below describes the system requirements specification (SRS) for the Secure Maintenance Device (SMD) system.

The SMD's capabilities may described as: (1) communicate with a trusted domain system (e.g., CPS actuator) and provide data transfer between untrusted and trusted domains. Effectively, giving the Cyber Physical System (CPS device (e.g., CPS actuator) the ability to move data across domains. Untrusted implies that the data and its environment is not cybersecurity assure to a level equivalent to the destination. When a CPS device is accredited for a security classification, then all data moving from the SMD to the CPS device may assure that the data meets the CPS device security classification; (2) digitally sign all data prior to transfer to the CPS; (3) connect with the CPS platform using a secured communication channel; (4) protect the SMD and the CPS from unintended/malicious users (e.g., disgruntle user, hackers) using One-Time Password, which is a password that is only valid for one use; and/or (5) Design to obtain favorable outcome from NIST RMF assessment.

The SMD Tablet (software and hardware) provides high assurance protection of the interaction with the CPS through the Configuration Interface Port. Also, it provides a mechanism to assure that the intended user has access to the SMD Tablet and the CPS (thus, removing the malicious threat from a malicious insider or unintended infection/transfer of malicious code).

There are various form-factors (e.g., tablets, laptops, desktops, and cloud). The below description focuses on the tablet edition. However, embodiments are not limited to this.

This description below describes the system-level requirements for the SMD system. One or more objectives of this specification of the SMD may be to: (1) provide a system overview of the SMD, including definition, goals, objectives, context, and major capabilities; (2) to specify the SMD's business requirements, functional requirements, data requirements, hardware requirements, hardware requirements, system security requirements, and/or system constraints.

The SMD may be a device that provides trusted and secured maintenance capabilities to a given Cyber-Physical System (CPS) (e.g., CPS actuator).

An objective of the Secure Maintenance Device (SMD) system is to securely maintain Cyber-Physical System (CPS) without invalidating its certification or bring in malicious software and data into the CPS.

The business objectives of the SMD are to provide the following business benefits to customers. The SMD will provide its customers with the capabilities to: (1) transfer data cross-domain from an untrusted source (SMD) to a trusted destination (CPS) or from an unclassified domain (SMD) to a classified domain (CPS). SMD will only handle adjacent domains; (2) authenticate user and only permit valid end user and CPS Suppliers to load software revisions, firmware revisions, diagnostics, production testing (as applicable), and parameter configurations into the CPS; (3) secure the communication channel between the SMD and the CPS; (4) secure all CPS data and SMD data. CPS data may include software revisions, firmware revisions, diagnostics, production testing, and parameter configurations; (5) transfer data cross-domain from a trusted source (CPS) to an untrusted destination (SMD) or from a classified domain (CPS) to an unclassified domain (SMD). SMD will only handle adjacent domains; (5) and/or store persistent data until it is transferred from the SMD. The data includes CPS data, security-relevant data, or SMD data.

The SMD may be secure to moderate impact level of NIST RMF using NIST SP 800-53 security controls to assure that the SMD is assessable & authorizable in accordance with NIST RMF.

The SMD may give a security provider the capabilities to securely maintain CPS without invalidating its certification or bring in malicious software and data into the CPS.

As an example, one example of a deployment environment may be targeted for a valve actuator. For this example, the valve actuator may include one or more of the following features:

TABLE 1

Example Product Features
Features

Connectors. The exterior enclosure of the actuator assembly may contain receptacle connectors.
The controller configuration interface may be used by the Actuator Supplier and end user for loading software revisions, firmware revisions, diagnostics, production testing (as applicable), and parameter configuration.

TABLE 1-continued

Example Product Features
Features

The network ports and controller configuration interface may be secured when not in use (e.g. physical lock).
All Software and firmware revisions may have capability to be updated from the controller configuration interface and not require actuator removal from valve assembly or disassembly of actuator.
The network ports and controller configuration interface may have a Purchaser approved means to accomplish software configuration management and cyber security
All receptacles require strain relief and may be covered when not in use.
To facilitate connection and disconnection of connectors, clearance may be maintained between the connector and any obstruction, so that the connectors can be grasped firmly by the hand and allow for rotation of the hand.
The actuator design may also utilize connectors as approved by the Purchaser to ease disassembly of the controller, motor or other sub components from the actuator assembly for repair/maintenance."
Configuration interface.
The controller may have one controller configuration interfaces for each actuator type.
The controller configuration interface may be a standard industry connection, such as Ethernet, RS 485, or RS 232.
The controller configuration interface may be used by the Actuator Supplier for loading software revisions, diagnostics, production testing (as applicable), and parameter configuration.
Any ports on the controller may be physically secured when not in use.
The port may be disabled when not in use and comply with cyber security requirements.

Figure 11:
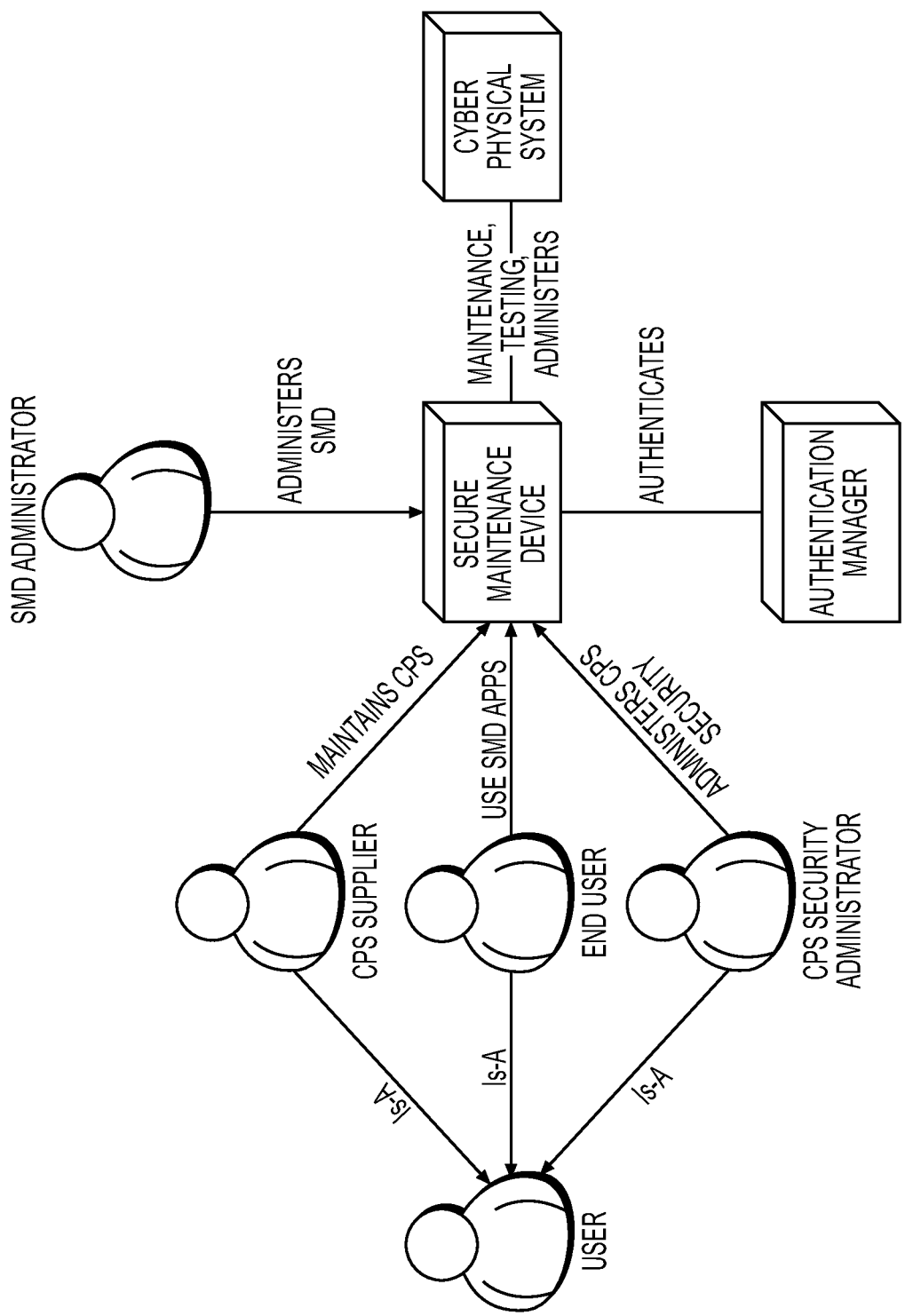
FIG. 11 depicts an example SMD Context Diagram, according to one or more embodiments.

Below, the context of the SMD in terms of the externals with which it interacts is described. As illustrated in the context diagram of FIG. 11, the SMD interfaces with several external actors and systems, and they are elaborated in the subsections.

The SMD includes software and hardware. Specifically, it is deployable onto one or more hardware platforms: (1) tablet, a platform for the SMD; specifically, targeting to be used with CPS; and/or laptop a platform for the SMD; specifically, targeting CPS that has a bigger footprint and requiring an SMD that can handle more data.

The SMD interacts, either directly or indirectly, with the following roles: end users, CPS suppliers, CPS security administrators, and/or SMD administrators.

End users may be any users that use the SMD to: (1) load the CPS software revisions, firmware revisions, parameter configurations, and data; and/or (2) execute some basic test to test the valve that the actuator is connected to.

CPS suppliers may be any users that developed the SMD. They have the capabilities to perform all the functions of the end user, plus the following capabilities: perform diagnostics of the CPS; perform production testing of the CPS; and/or download CPS data or security data to the CPS. CPS Suppliers may not have the capabilities to perform security administrator capabilities. Also, the CPS Supplier will be able to execute apps that support the administration capabilities of the CPS.

CPS security administrators, which may be any security officers with the privilege to administer the CPS. This person will use the SMD to: retrieve the security audit logs, configure security parameters, and/or establish access privileges An SMD administrator, which may be an administrator with the privilege to administer the SMD. It may be the responsibility of this role to install and configure the SMD, review logs, and/or run diagnostics.

The SMD interacts, either directly or indirectly, with the following external systems: authentication manager, which is a service system that authenticates the one-time password (OTP) by the user; and/or cyber-physical systems. The cyber-physical system is a system that includes interacting digital, analog, physical, and human components engineered for function through integrated physics and logic. The first targeted CPS is the actuators. There may be five different actuators, differing only by their mechanical characteristics.

This below description provides a high-level overview of the major capabilities of the SMD. The SMD will provide the following capabilities to the end users (e.g., CPS User). End users may load the CPS software revisions, firmware revisions, parameter configurations, and data.

CPS suppliers may (1) load the CPS software revisions, firmware revisions, parameter configurations, and data; (2) perform diagnostics of the CPS; (3) Perform production testing of the CPS; (4) download CPS data or security data to the CPS; and/or (5) execute apps that support the administration capabilities of the CPS.

CPS security administrators may (1) retrieve the security audit logs; (2) configure security parameters; and/or (3) establish access privileges.

The SMD may provide the following capabilities to the SMD administrator: install SMD; configure SMD; review logs; and/or run diagnostics.

The SMD may interact with the Authentication Manager to verify OTP to permit access to the SMD. The SMD may implement NIST SP 800-53 at moderate impact level.

The section of the SRS specifies the functional features of the SMD in terms of use cases and their associated use case paths. The use case model is organized in terms of the externals that benefit from the use cases.

Figure 12:
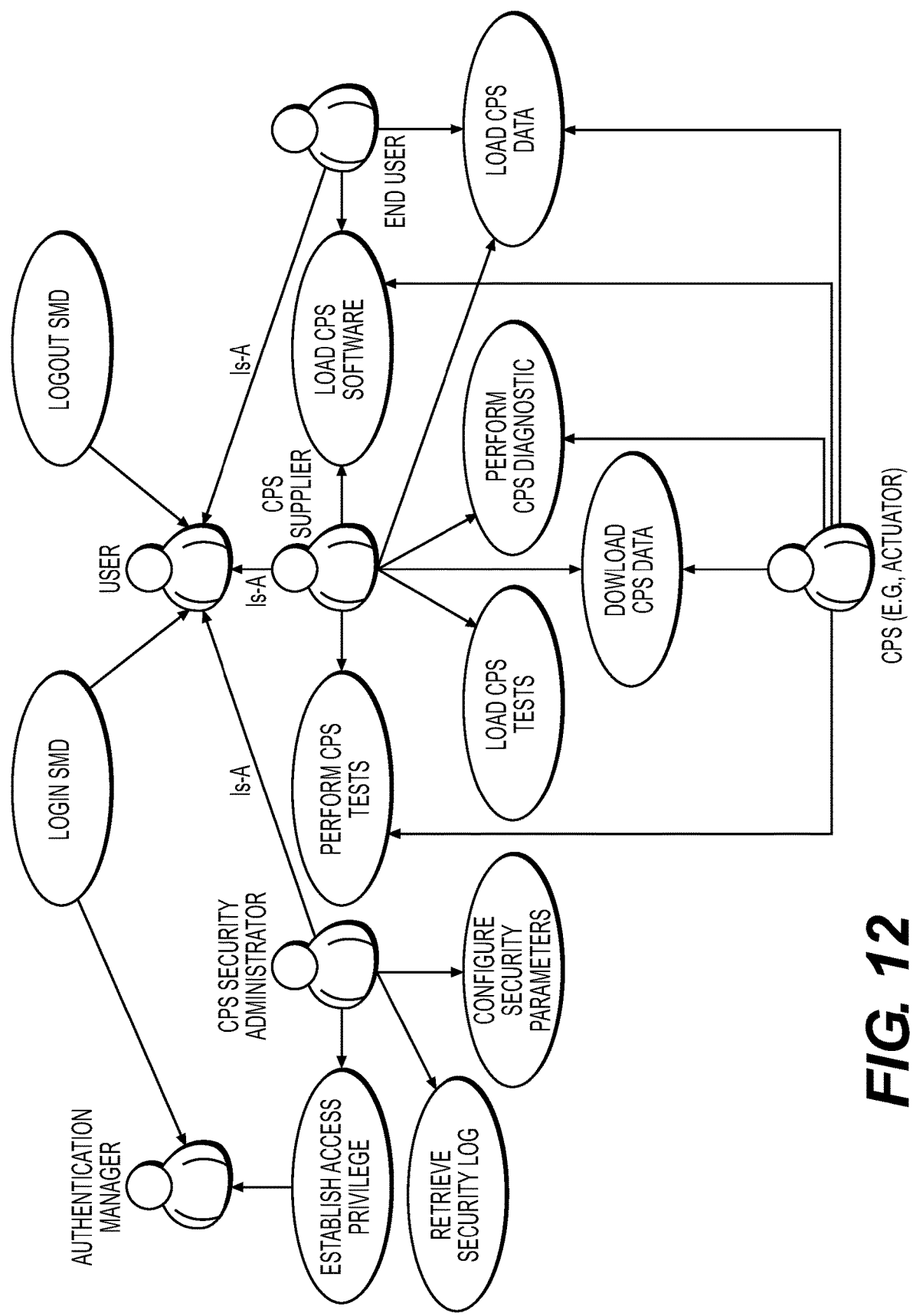
FIG. 12 depicts an example user summary use case diagram, according to one or more embodiments.
Figure 13:
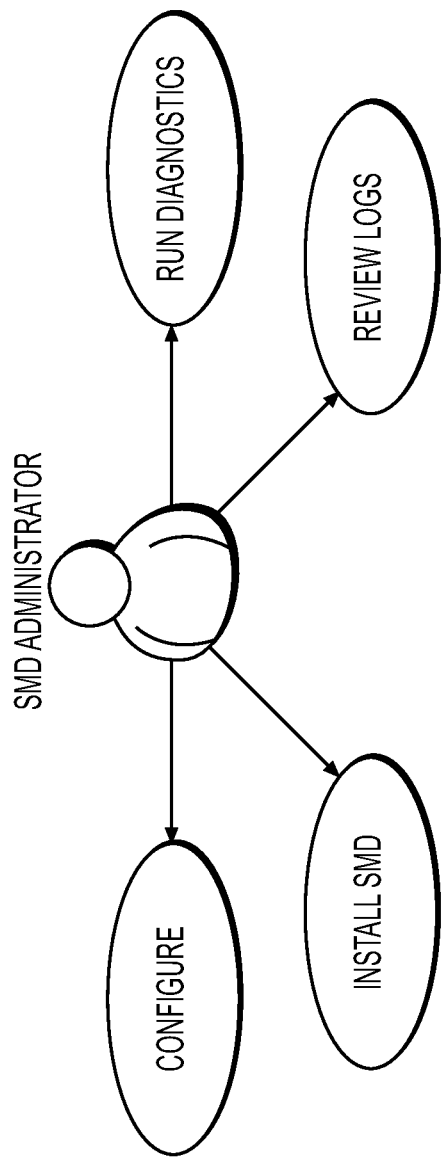
FIG. 13 depicts an example SMD administrator summary use case diagram, according to one or more embodiments.

FIGS. 12 and 13 summarize the functional features for the SMD. FIG. 12 depicts an example user summary use case diagram, according to one or more embodiments. FIG. 13 depicts an example SMD administrator summary use case diagram, according to one or more embodiments.

The below description describes and specifies external roles, the associated responsibilities, and all use cases primarily driven by these externals. This below description specifies the functional features primarily associated with end users (e.g., accountants). According to one or more embodiments, an end user is a user who interacts with the CPS to update its software and data. An end user may have the responsibilities of loading the CPS software revisions, firmware revisions, parameter configurations, and data into the CPS device. An end user may have the following technical expertise, experience, and training to effectively interact with the SMD: basic knowledge of CPS administration; and/or basic knowledge of SMD usage.

Figure 14:
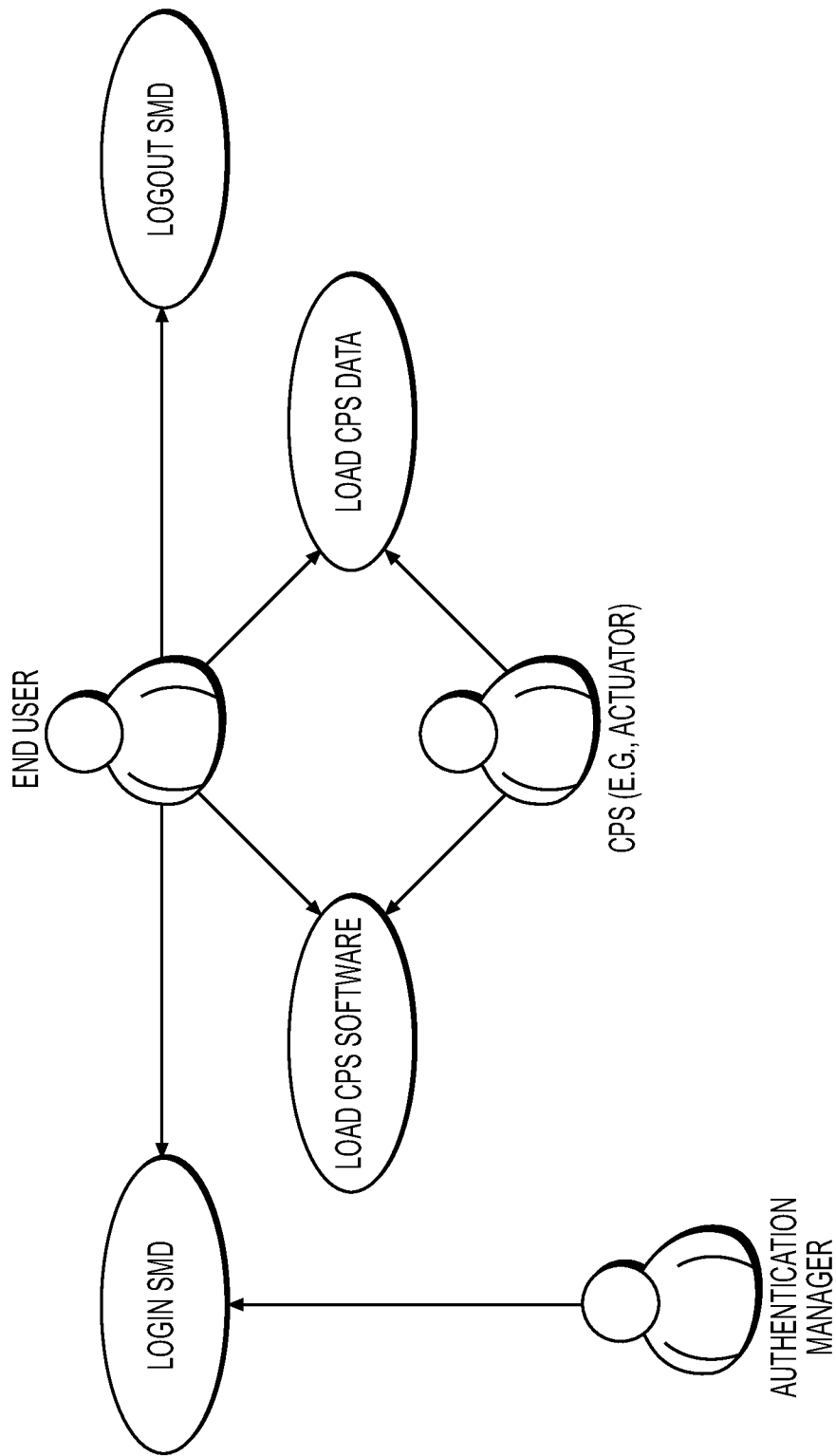
FIG. 14 depicts an example end user use case diagram, according to one or more embodiments.

FIG. 14 depicts an end user Use Case Diagram, according to one or more embodiments. The use cases may include: end user logs into SMD, end user Loads CPS Software, end user Loads CPS Data, and/or end user logs out of SMD.

According to one or more embodiments, the Use Case of end user logs into SMD may include feature number: SMD-FUNC-001. The Secure Maintenance Device may have the capability for an authenticated end user to access the SMD. Three Factors Authentication may be used to authenticate the user (e.g., One-Time-Password). Access to capabilities will depend on the user role. There may be at least four roles for SMD: end user, CPS Supplier, CPS security administrator, and/or SMD administrator.

According to one or more embodiments, the user will enter the pin plus passcode from a token generator. This will be used to authenticate the user and grant him/her access to the authorized resources. The pin is revocable, based on the status of the user. The token generator can be invalided at any time depending on the user status. The pin may be kept up-to-date at all times.

In the case of the CPS actuation as the CPS device, the CPS Platform authentication service may be used to authenticate the CPS Users to SMD. The CPS Supplier will be granted a CPS Platform token/pin.

According to one or more embodiments, the Use Case of end user loads CPS Software may include feature number: SMD-002. The Secure Maintenance Device may have the capability for an authenticated end user to load CPS Software onto the CPS device. More specifically, the basic steps are: (1) The authenticated end user (who is authorized) is given access to the CPS Software App; (2) The CPS Software App allows the user to upload the CPS Software into the untrusted domain of the SMD; (3) The SMD cleanse the CPS Software cleanses for virus and malware; (4) The SMD checks the CPS Software for integrity and authenticity. (5) the SMD checks the CPS Software to ensure that only the right quantity and types are included in the package; (6) The SMD transfers the CPS Software from the untrusted domain to the trusted domain of the SMD using a cross-domain security solution; (7) The SMD digitally signed the CPS Software; (8) The SMD establishes the communication channel between the SMD and the CPS device. This communication channel is protected such that it provides confidentiality, integrity, and authenticity (e.g., VPN or IPSec); (9) The SMD uses the SMD MAC address to authenticate its legitimacy; (10) The SMD transfers the CPS Software to the CPS device; and/or (11) the SMD terminates the connection.

According to one or more embodiments, the Use Case of end user loads CPS Data may include feature number: SMD-FUNC-003. The Secure Maintenance Device may have the capability for an authenticated end user to load CPS Data onto the CPS device. More specifically, it follows the same basic steps as the end user loads CPS Software into the CPS device (see, e.g., end user loads CPS Software) except it is loading CPS Data instead of CPS Software.

According to one or more embodiments, the Use Case of end user logs off SMD may include feature number: SMD-FUNC-004. The Secure Maintenance Device may have the capability for a user to log off the SMD. Once the user selects to log off the SMD, the SMD will shut down the SMD software and power of the tablet.

According to one or more embodiments, the functional features primarily associated with CPS suppliers (e.g., accountants) are described below. A CPS Supplier is a user who interacts with the CPS to maintain the CPS device. A CPS Supplier may have the following responsibilities: (1) Load the CPS software revisions, firmware revisions, parameter configurations, and data into the CPS device; (2) Load CPS Tests; (3) Perform diagnostics of the CPS; (4) perform production testing of the CPS; and/or (5) Download CPS data or security data to the CPS. A CPS Supplier may have the following technical expertise, experience, and training to effectively interact with the SMD: knowledge of CPS device, knowledge of CPS administration, and basic knowledge of the SMD usage.

Figure 15:
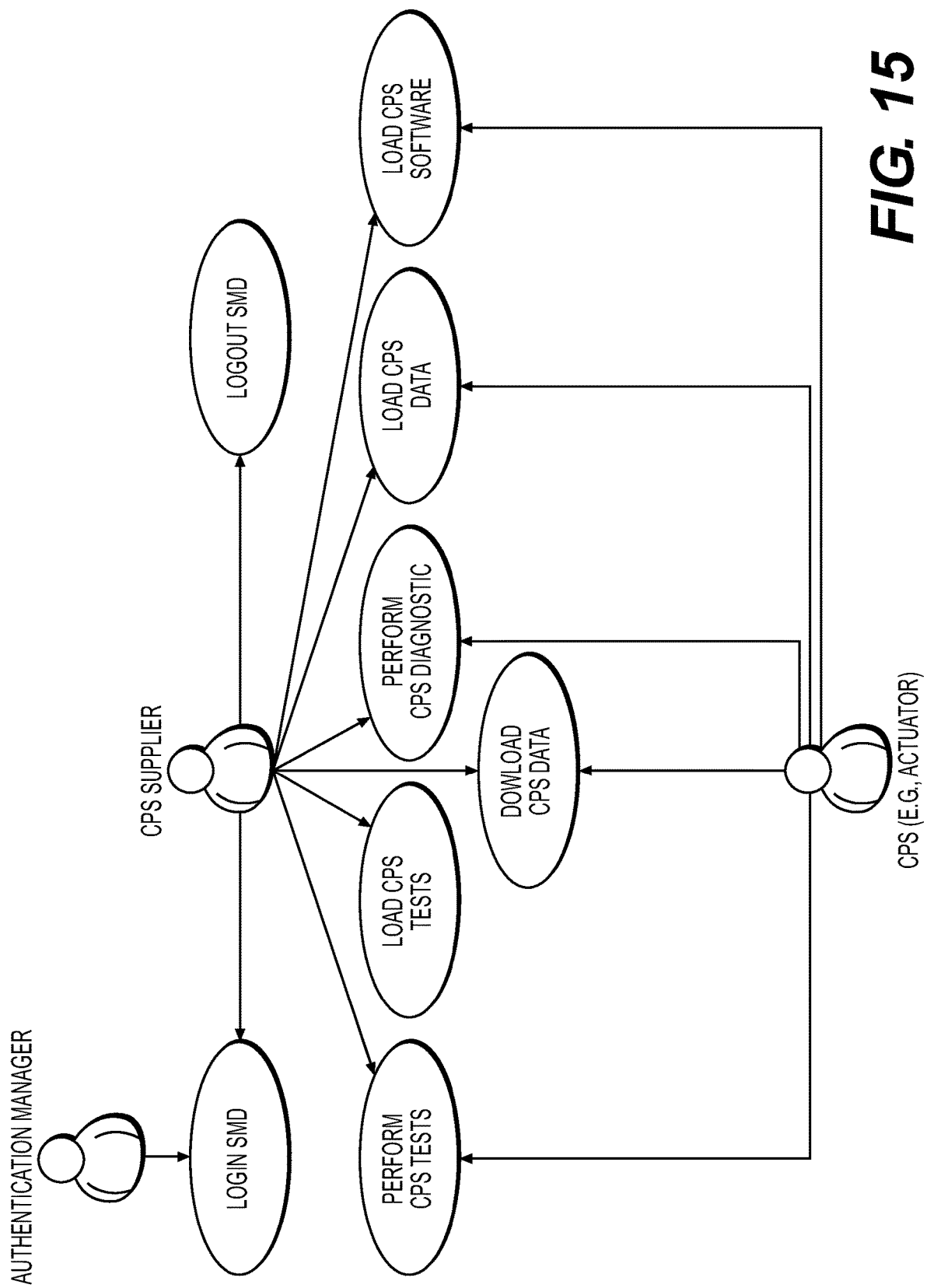
FIG. 15 depicts an example CPS supplier use case diagram, according to one or more embodiments.

FIG. 15 depicts an example CPS supplier use case diagram, according to one or more embodiments. The use cases may be CPS Supplier logs into SMD, CPS Supplier Loads CPS Software, CPS Supplier Loads CPS Data, CPS Supplier Performs CPS Diagnostic, CPS Supplier Performs CPS Test, CPS Supplier Downloads CPS Data, CPS Supplier Executes CPS Apps and/or CPS logs out of SMD.

According to one or more embodiments, the Use Case of CPS Supplier logs into SMD may include feature number:

SMD-FUNC-001. This use case is similar to the use case described above with the actor being CPS Supplier instead of end user.

According to one or more embodiments, the Use Case of CPS Supplier Loads CPS Software may include feature number: SMD-FUNC-002. This use case is similar to the use case described above with the actor being CPS Supplier instead of end user.

According to one or more embodiments, the Use Case of CPS Supplier Performs CPS Tests may include feature number: SMD-FUNC-005. This use case is similar to the use case described above with the actor being CPS Supplier instead of end user. The Secure Maintenance Device may have the capability for an authenticated CPS Supplier to perform a suite of tests on the CPS device. More specifically, the basic steps are: (1) the authenticated CPS Supplier (who is authorized) is granted access to the CPS Test App that has been preloaded with the CPS test suite. This app resides on the trusted domain of the SMD; (2) CPS Test App establishes a secure connection with the CPS device; (3) CPS Test App sends a request to the CPS device to execute a test suite; (4) The CPS device will be modified (if possible) to notify the CPS Environment (e.g., CPS Platform) of a request to execute a specific CPS device; (5) Once the CPS Environment (e.g., CPS Platform) approved the request, the CPS device completes its operating function and puts itself in a test mode, and will notify the SMD that it is ready to be tested. The approval loop ensures that the test exercise is not malicious and intended; (6) The CPS Test App executes the test suite; (7) The CPS Test App instructs the CPS device to switch back into operational mode; and/or (8) The CPS Test App terminates. If the CPS device is not designed with the capabilities of specifying CPS Notification Receiver, then the SMD does not request access, and assumes access is given. Further, with the SASH, Security Provider can perform digital twin to execute test without requiring the actuation to be offline.

According to one or more embodiments, the Use Case of CPS Supplier Load CPS Test may include feature number: SMD-FUNC-006. The Secure Maintenance Device may have the capability for an authenticated CPS Supplier to load a suite of tests onto the SMD. This use case follows the same approach as uploading the CPS Data to SMD except the test suite is not transferred to the CPS device.

According to one or more embodiments, the Use Case of CPS Supplier Downloads CPS Data may include feature number: SMD-FUNC-007. The Secure Maintenance Device may have the capability for an authenticated CPS Supplier to download CPS Data onto the SMD. More specifically, the basic steps are: (1) The authenticated CPS Supplier (who is authorized) is granted access to the CPS Download App; (2) The CPS Download App establishes a secured communication channel with the CPS device; (3) Once a connection is established, it allows the CPS Supplier to interact with the CPS device and prepare the data for transfer; and/or (4) The CPS Data is moved from the CPS device to the SMD trusted domain. The data is available for view and processing on the trusted domain.

According to one or more embodiments, an option is available to transfer the CPS Data from the trusted domain to the untrusted domain using a cross-domain solution. Once the data is available on the untrusted domain side of the SMD, it can be exported to an external device.

According to one or more embodiments, the Use Case of CPS Supplier logs out of SMD may include feature number: SMD-FUNC-004. This is similar to the above description with the actor being CPS Supplier instead of end user.

This below description specifies the functional features primarily associated with CPS security administrator (e.g., accountants). A CPS security administrator is a user who has the privilege to administer the security aspect of the CPS (e.g., management of the security logs). The CPS security administrator may have the following responsibilities: (1) Load the CPS software revisions, firmware revisions, parameter configurations, and data into the CPS device; (2) Load CPS Tests; (3) Perform diagnostics of the CPS; (4) Perform production testing of the CPS; and/or (5) Download CPS data or security data to the CPS.

A CPS User may need the following technical expertise, experience, and training to effectively interact with the SMD: Knowledge of CPS device, Knowledge of CPS security administration, Basic knowledge of the SMD usage.

Figure 16:
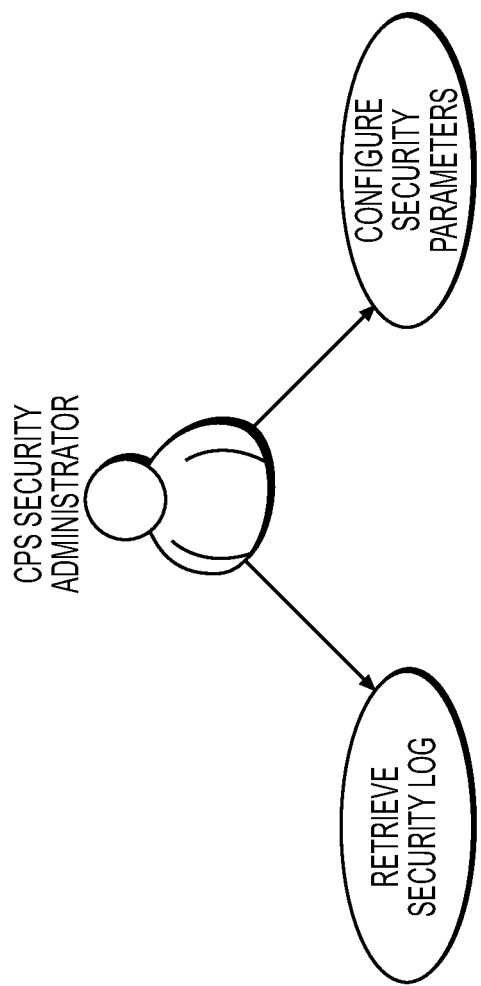
FIG. 16 depicts an example CPS security administrator use case diagram, according to one or more embodiments.

FIG. 16 depicts an example CPS security administrator use case diagram, according to one or more embodiments. The use cases may include: login SMD, retrieve security log, configure security parameters, and logout SMD.

According to one or more embodiments, the Use Case of CPS Security administrator logs into SMD may include feature number: SMD-FUNC-001. This use case may be similar to the description above with the actor being CPS security administrator instead of end user.

According to one or more embodiments, the Use Case of CPS security administrator logs into SMD may include feature number: SMD-FUNC-001. This use case may be similar to the description above with the actor being CPS security administrator instead of end user.

According to one or more embodiments, the Use Case of CPS security administrator Retrieves Security Log may include feature number: SMD-FUNC-008. The Secure Maintenance Device may have the capability for an authenticated CPS security administrator to package and transfer from the CPS device to the SMD. The authenticated CPS security administrator (who is authorized) launches the CPS Security Admin App and follows the same procedure as described above with Downloads CPS Data except that it is downloading the security log and the authorized role is CPS security administrator.

According to one or more embodiments, the Use Case of CPS security administrator Configures Security Parameters may include feature number: SMD-FUNC-009. The Secure Maintenance Device may have the capability for an authenticated CPS security administrator to configure security parameters. More specifically, the basic steps may be: (1) the authenticated CPS security administrator is granted accesses to the CPS Security Admin App; (2) the CPS Security Admin App is launched and establishes a secure connection with the CPS device; (3) the CPS Security Admin App sends a request to the CPS device to access its security data and programs; (4) the CPS device will be modified (if possible) to notify a CPS device Monitor as specified in the CPS Security Configuration File; (5) when the request is granted, the CPS device gives SMD access to the security data and programs; and/or (6) the CPS security administrator has the capabilities to configure the security parameters as needed. The above description may assume that the CPS device is designed to be role aware. If it is not, then the SMD Trusted Domain may implement the CPS device roles and authorize accordingly. Further, it may be assumed that the CPS device is designed with the capabilities of specifying CPS Notification Receiver. If it is not, then the SMD will not request access, and it will assume that access is given to the SMD.

According to one or more embodiments, the Use Case of CPS security administrator logs out of SMD may include feature number: SMD-FUNC-004. The Secure Maintenance Device may have the capability for an authenticated CPS security administrator to log off the SMD. This use case may be similar to the description above with the actor being CPS security administrator instead of end user.

According to one or more embodiments, the Use Case of CPS security administrator logs out of SMD may include feature number: SMD-FUNC-004 (but with CPS security administrator role). An SMD administrator is a role played by a user who has the privilege to administer the SMD including security functions. The SMD administrator has the following responsibilities: install the SMD; configure the SMD; and/or perform diagnostics of the SMD. A CPS User may need the following technical expertise, experience, and training to effectively interact with the SMD: knowledge of CPS device; knowledge of CPS security administration; and/or basic knowledge of the SMD usage.

Figure 17:
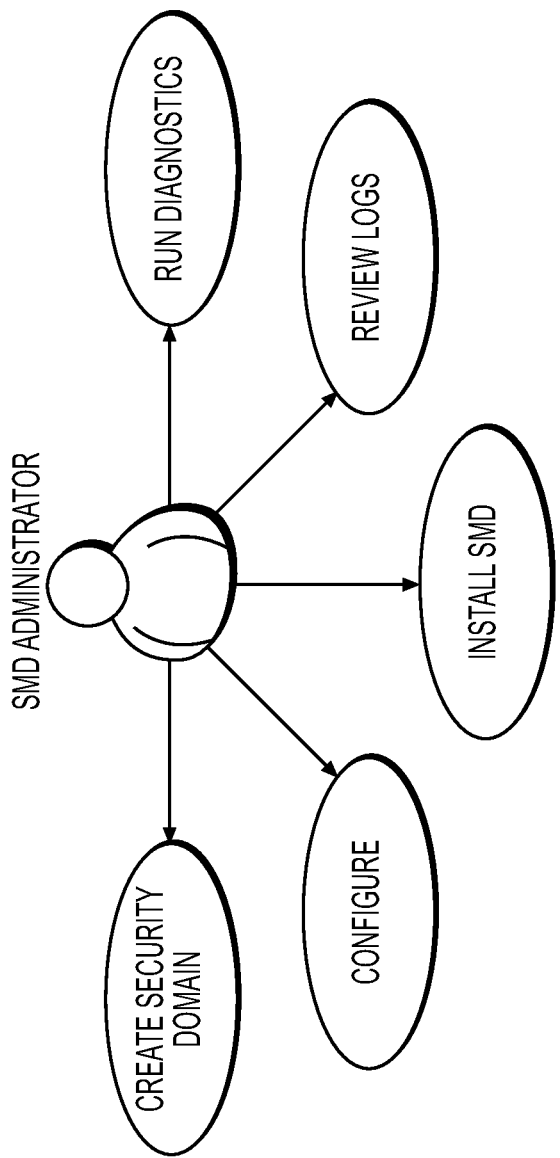
FIG. 17 depicts an example SMD administrator use case diagram, according to one or more embodiments.

FIG. 17 depicts an example SMD administrator use case diagram, according to one or more embodiments. The use cases may include Login SMD; Configure SMD; Install SMD; Review logs; Run Diagnostics; Logout SMD; and/or Create Security Domain.

According to one or more embodiments, the Use Case of SMD administrator logs into SMD may include feature number: SMD-FUNC-001 Login SMD (but with SMD administrator role). This use case may be similar to the description above with the actor being CPS security administrator instead of end user.

According to one or more embodiments, the SMD administrator Installs SMD may include feature number: SMD-FUNC-010 Install SMD. This use case may be similar to the description above with the actor being CPS security administrator instead of end user. The Secure Maintenance Device may have the capability for an authenticated SMD administrator to load SMD Software Package onto SMD and initiate the installation. More specifically, the SMD Install App uses the same services as described above with respect to end user loads CPS Software to upload and cleanse to assure that it is free of malware and virus. More importantly, it should assure its integrity and authenticity. Once it is verified, the SMD Install App informs the SMD administrator to initiate the installation. After the installation, the SMD administrator is given options to reboot.

According to one or more embodiments, the Use Case of SMD administrator Configures SMD may include feature number: SMD-FUNC-011 Configure SMD. The Secure Maintenance Device may have the capability for an authenticated SMD administrator to modify various attributes of the load SMD Software Package onto SMD and initiate the installation. More specifically, the basic steps may be: 1. the authenticated SMD administrator (who is authorized) is granted access to the SMD Configuration App; 2. the SMD Configuration App allows the SMD administrator to modify various attributes of the SMD (e.g., screen lock, colors, etc.); and or 3. once the SMD administrator completed the configuration, it will be given the option to end the app and perform another function.

According to one or more embodiments, the Use Case of SMD administrator Runs Diagnostics may include feature number: SMD-FUNC-012 Run Diagnostics. The Secure Maintenance Device may have the capability for an authenticated SMD administrator to execute a given set of test suite to diagnose the SMD.

According to one or more embodiments, the Use Case of SMD administrator logs out SMD may include feature number: SMD-FUNC-004. This use case may be similar to the description above for end user logs off SMD with the actor being CPS Supplier instead of end user.

According to one or more embodiments, the Use Case of SMD administrator creates Security Domains may include feature number: SMD-FUNC-013. The Secure Maintenance Device may have the capability for an authenticated SMD administrator to create a $3^{rd}$ party security domain, install $3^{rd}$ party apps, and allows for connection to another CPS device. More specifically, the basic steps may be: (1) the authenticated SMD administrator (who is authorized) is granted access to the SMD Configuration App' (2) the SMD Configuration App allows the SMD administrator to create a $3^{rd}$ Party Security Domain. This domain is a trusted domain; (3) the SMD Configuration App allows the SMD administrator to install and configuration $3^{rd}$ Party application in the domain. All third parties should comply with SMD security requirements for application development to qualify to deploy on the SMD; and/or (4) once the SMD administrator completed the container creation, it will be given the option to end the app and perform another function.

TABLE 2

Functional Features Summary

| Feature Number | Title |
| --- | --- |
| SMD-FUNC-001 | Login SMD |
| SMD-FUNC-002 | Load CPS Software |
| SMD-FUNC-003 | Load CPS Data |
| SMD-FUNC-004 | Logout SMD |
| SMD-FUNC-005 | Perform CPS Test |
| SMD-FUNC-006 | Load CPS Test |
| SMD-FUNC-007 | Download CPS Data |
| SMD-FUNC-008 | Retrieve Security Log |
| SMD-FUNC-009 | Configure Security Parameters |
| SMD-FUNC-010 | Configure SMD |
| SMD-FUNC-011 | Install SMD |
| SMD-FUNC-012 | Run Diagnostics |
| SMD-FUNC-013 | Create Security Domain |

CPS Software is a collection of executable, binary and plain text files that make up the package for updating the CPS device software. They may include: CPS Firmware (binary file), CPS Program (executable file), CPS Configuration (plain text file), CPS Update Readme (plain text file), and/or CPS Data that represents data that resides on the CPS device.

The CPS data may be CPS Test cases (plain text files), CPS Test scripts (plain text files), CPS Security Log (encrypted file), CPS Configurations (plain text file), and/or CPS Security Configuration File (encrypted file).

SMD Software may be a collection of executable, binary and plain text files that make up the package for updating the SMD. They may include: SMD Program (executable file), SMD Configuration (plain text file), SMD Update Readme (plain text file), and/or SMD Data represents data that resides on the SMD. The SMD data may be: SMD Test cases (plain text files), SMD Test scripts (plain text files), SMD Security Log (encrypted file), SMD Configurations (plain text file), and/or SMD Security Configuration File (encrypted file).

The SMD data may include SMD-DATA-001: The SMD may provide the capabilities to store the CPS Software and CPS Data in the untrusted and trusted domains; SMD-DATA-002: The SMD may provide the capability to process the CPS Software and CPS Data as described above in the functional features section; SMD-DATA-003: The SMD may provide the capabilities to store the SMD Software and SMD Data in the untrusted and trusted domains; and/or SMD-DATA-004: The SMD may provide the capability to process the SMD Software and SMD Data as described above in the functional features section.

The hardware for the SMD may include: SMD-HW-001: The SMD may be a mobile device that can be taken to the location of the CPS devices (e.g., CPS actuator) distributed through the environment (e.g., CPS); SMD-HW-002: The SMD may be ruggedized for military use (e.g., on a carrier ship); SMD-HW-003: The SMD may have a sufficient number of hours of battery life; and/or SMD-HW-004: The SMD may have the following hardware specification: persistent memory, volatile memory, processing capacity, and/or screen size.

This below description includes the security requirements that specify the extent to which the SMD may protect itself and its sensitive data and communications from accidental, malicious, or unauthorized access, use, modification, destruction, or disclosure. The security requirements may implement security controls that allow the SMD to meet the NIST SP 800-53 requirements such that SMD meets moderator assurance impact level.

Below are the technical moderate impact requirements from NIST SP 800-53 that may be implemented by the SMD:

TABLE 3

Example CPS Features

| SMD # | NIST # | NIST Title | NIST Description |
|---|---|---|---|
| SMD-SEC-001 | AC-4 | Information Flow Enforcement | The information system enforces approved authorizations for controlling the flow of information within the system and between interconnected systems in accordance with applicable policy. |
| SMD-SEC-002 | AC-5 | Separation of Duties | The organization: Separates duties of individuals as necessary, to prevent malevolent activity without collusion; Documents separation of duties; and Implements separation of duties through assigned information system access authorizations. |
| SMD-SEC-003 | AC-6 | Least Privilege | The organization employs the concept of least privilege, allowing only authorized accesses for users (and processes acting on behalf of users) which are necessary to accomplish assigned tasks in accordance with organizational missions and business functions. |
| SMD-SEC-004 | AC-7 | Unsuccessful Login Attempts | The information system: Enforces a limit of [Assignment: organization-defined number] consecutive invalid login attempts by a user during a [Assignment: organization-defined time period]; and Automatically [Selection: locks the account/node for an [Assignment: organization-defined time period]; locks the account/node until released by an administrator; delays next login prompt according to [Assignment: organization-defined delay algorithm]] when the maximum number of unsuccessful attempts is exceeded. The control applies regardless of whether the login occurs via a local or network connection. |
| SMD-SEC-005 | AC-8 | System Use Notification | The information system: Displays an approved system use notification message or banner before granting access to the system that provides privacy and security notices consistent with applicable federal laws, Executive Orders, directives, policies, regulations, standards, and guidance and states that: (i) users are accessing a U.S. Government information system; (ii) system usage may be monitored, recorded, and subject to audit; (iii) unauthorized use of the system is prohibited and subject to criminal and civil penalties; and (iv) use of the system indicates consent to monitoring and recording; Retains the notification message or banner on the screen until users take explicit actions to log on to or further access the information system; and For publicly accessible systems: (i) displays the system use information when appropriate, before granting further access; (ii) displays references, if any, to monitoring, recording, or auditing that are |

TABLE 3-continued

Example CPS Features

| SMD # | NIST # | NIST Title | NIST Description |
|---|---|---|---|
| | | | consistent with privacy accommodations for such systems that generally prohibit those activities; and (iii) includes in the notice given to public users of the information system, a description of the authorized uses of the system. |
| SMD-SEC-006 | AC-11 | Session Lock | The information system: Prevents further access to the system by initiating a session lock after [Assignment: organization-defined time period] of inactivity or upon receiving a request from a user; and Retains the session lock until the user reestablishes access using established identification and authentication procedures. |
| SMD-SEC-007 | AC-18 | Wireless Access | The organization: Establishes usage restrictions and implementation guidance for wireless access; Monitors for unauthorized wireless access to the information system; Authorizes wireless access to the information system prior to connection; and enforces requirements for wireless connections to the information system. |
| SMD-SEC-008 | AU-2 | Auditable Events | The organization: Determines, based on a risk assessment and mission/business needs, that the information system may be capable of auditing the following events: [Assignment: organization-defined list of auditable events]; Coordinates the security audit function with other organizational entities requiring audit-related information to enhance mutual support and to help guide the selection of auditable events; Provides a rationale for why the list of auditable events are deemed to be adequate to support after-the-fact investigations of security incidents; and Determines, based on current threat information and ongoing assessment of risk, that the following events are to be audited within the information system: [Assignment: organization-defined subset of the auditable events defined in AU-2 a. to be audited along with the frequency of (or situation requiring) auditing for each identified event]. |
| SMD-SEC-009 | AU-3 | Content of Audit Records | The information system produces audit records that contain sufficient information to, at a minimum, establish what type of event occurred, when (date and time) the event occurred, where the event occurred, the source of the event, the outcome (success or failure) of the event, and the identity of any user/subject associated with the event. |
| SMD-SEC-010 | AU-4 | Audit Storage Capacity | The organization allocates audit record storage capacity and configures auditing to reduce the likelihood of such capacity being exceeded. |
| SMD-SEC-011 | AU-5 | Response To Audit Processing Failures | The information system: Alerts designated organizational officials in the event of an audit processing failure; and Takes the following additional actions: [Assignment: organization-defined actions to be taken (e.g., shut down information system, overwrite oldest audit records, stop generating audit records)]. |
| SMD-SEC-012 | AU-7 | Audit Reduction and Report Generation | The information system provides an audit reduction and report generation capability. |
| SMD-SEC-013 | AU-8 | Time Stamps | The information system uses internal system clocks to generate time stamps for audit records. |

TABLE 3-continued

Example CPS Features

| SMD # | NIST # | NIST Title | NIST Description |
|---|---|---|---|
| SMD-SEC-014 | AU-9 | Protection of Audit Information | The information system protects audit information and audit tools from unauthorized access, modification, and deletion. |
| SMD-SEC-015 | AU-12 | Audit Generation | The information system: Provides audit record generation capability for the list of auditable events defined in AU-2 at [Assignment: organization-defined information system components]; Allows designated organizational personnel to select which auditable events are to be audited by specific components of the system; and Generates audit records for the list of audited events defined in AU-2 with the content as defined in AU-3. |
| SMD-SEC-016 | IA-2 | Identification and Authentication (Organizational Users) | The information system uniquely identifies and authenticates organizational users (or processes acting on behalf of organizational users). |
| SMD-SEC-017 | IA-3 | Device Identification and Authentication | The information system uniquely identifies and authenticates [Assignment: organization-defined list of specific and/or types of devices] before establishing a connection. |
| SMD-SEC-018 | IA-6 | Authenticator Feedback | The information system obscures feedback of authentication information during the authentication process to protect the information from possible exploitation/use by unauthorized individuals |
| SMD-SEC-019 | IA-7 | Cryptographic Module Authentication | The information system uses mechanisms for authentication to a cryptographic module that meet the requirements of applicable federal laws, Executive Orders, directives, policies, regulations, standards, and guidance for such authentication. |
| SMD-SEC-020 | IA-8 | Identification and Authentication (Non-organizational Users) | The information system uniquely identifies and authenticates non-organizational users (or processes acting on behalf of non-organizational users). |
| SMD-SEC-021 | SC-2 | Application Partitioning | The information system separates user functionality (including user interface services) from information system management functionality. |
| SMD-SEC-022 | SC-4 | Information In Shared Resources | The information system prevents unauthorized and unintended information transfer via shared system resources. |
| SMD-SEC-023 | SC-5 | Denial of Service Protection | The information system protects against or limits the effects of the following types of denial of service attacks: [Assignment: organization-defined list of types of denial of service attacks or reference to source for current list]. |
| SMD-SEC-024 | SC-7 | Boundary Protection | The information system: Monitors and controls communications at the external boundary of the system and at key internal boundaries within the system; and Connects to external networks or information systems only through managed interfaces consisting of boundary protection devices arranged in accordance with an organizational security architecture. |
| SMD-SEC-025 | SC-8 | Transmission Integrity | The information system protects the integrity of transmitted information. |
| SMD-SEC-026 | SC-9 | Transmission Confidentiality | The information system protects the confidentiality of transmitted information. |
| SMD-SEC-027 | SC-10 | Network Disconnect | The information system terminates the network connection associated with a communications session at the end of the |

TABLE 3-continued

Example CPS Features

| SMD # | NIST # | NIST Title | NIST Description |
|---|---|---|---|
| | | | session or after [Assignment: organization-defined time period] of inactivity. |
| SMD-SEC-028 | SC-12 | Cryptographic Key Establishment and Management | The organization establishes and manages cryptographic keys for required cryptography employed within the information system. |
| SMD-SEC-029 | SC-13 | Use of Cryptography | The information system implements required cryptographic protections using cryptographic modules that comply with applicable federal laws, Executive Orders, directives, policies, regulations, standards, and guidance. |
| SMD-SEC-030 | SC-14 | Public Access Protections | The information system protects the integrity and availability of publicly available information and applications. |
| SMD-SEC-031 | SC-15 | Collaborative Computing Devices | The information system: Prohibits remote activation of collaborative computing devices with the following exceptions: [Assignment: organization-defined exceptions where remote activation is to be allowed]; and Provides an explicit indication of use to users physically present at the devices. |
| SMD-SEC-032 | SC-20 | Secure Name/ Address Resolution Service (Authoritative Source) | The information system provides additional data origin and integrity artifacts along with the authoritative data the system returns in response to name/address resolution queries. |
| SMD-SEC-033 | SC-22 | Architecture and Provisioning for Name/Address Resolution Service | The information systems that collectively provide name/address resolution service for an organization are fault-tolerant and implement internal/external role separation. |
| SMD-SEC-034 | SC-23 | Session Authenticity | The information system provides mechanisms to protect the authenticity of communications sessions. |
| SMD-SEC-035 | SC-28 | Protection of Information At Rest | The information system protects the confidentiality and integrity of information at rest. |
| SMD-SEC-036 | SC-32 | Information System Partitioning | The organization partitions the information system into components residing in separate physical domains (or environments) as deemed necessary. |

According to one or more embodiments, the SMD may be designed such that it is certifiable to process and store United States military classifications. The SMD may meet with NIST RMF requirement such that the SMD is assessable and authorizable when it is integrated and deployed onto a system environment. The SMD may meet a standard for the military at sea use for mobile devices.

Figure 18:
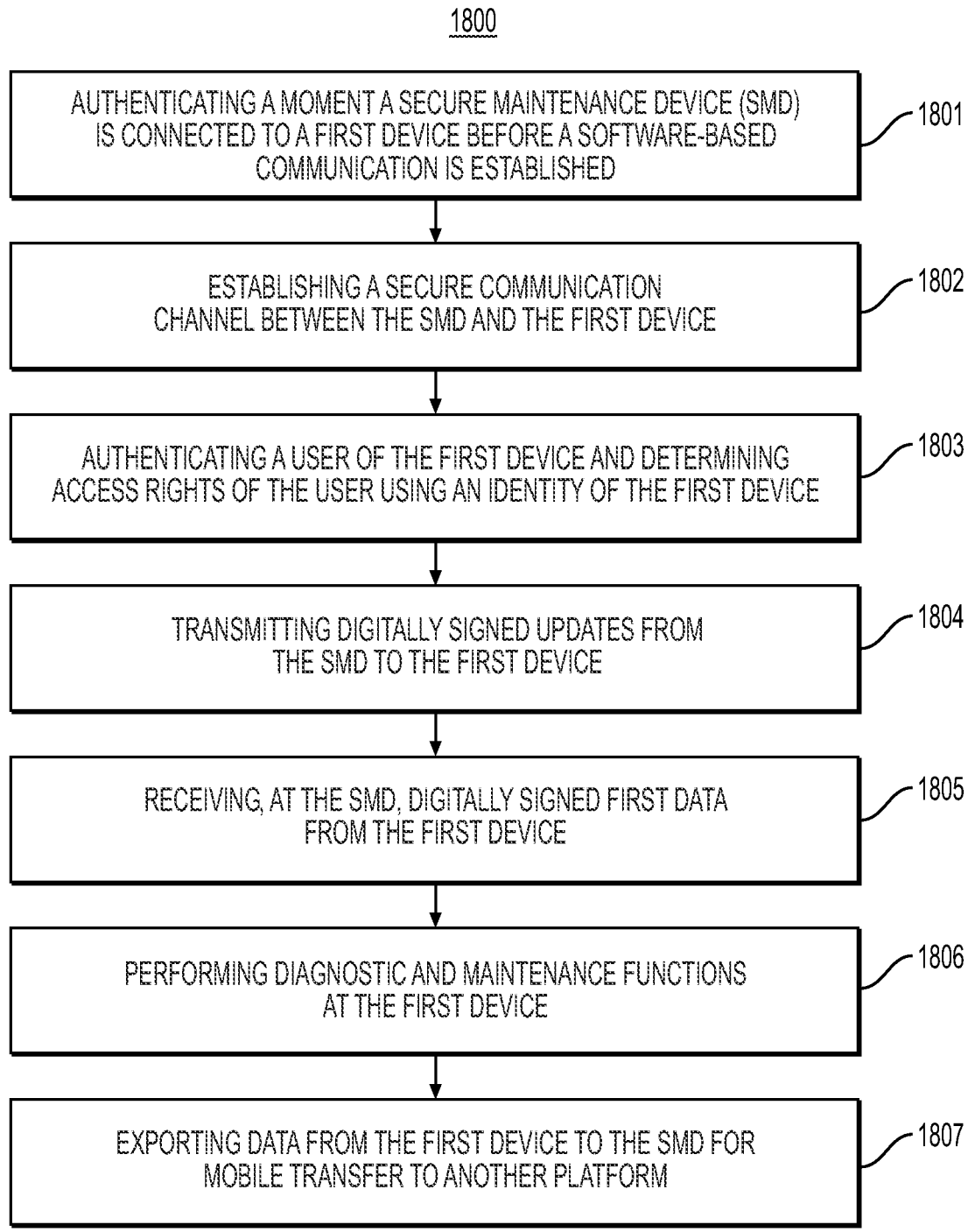
FIG. 18 depicts a flowchart of a method for securely updating a device, according to one or more embodiments.

FIG. 18 depicts a flowchart of a method 1800 for providing a secure and assured method for updating software of a cyber-physical system (CPS) device, maintaining a CPS device, diagnosing a CPS device, and transferring of CPS data, according to one or more embodiments. For example, at step 1801, the method may include authenticating a moment a secure maintenance device (SMD) is connected to a first device before a software-based communication is established. At step 1802, the method may include establishing a secure communication channel between the SMD and the first device. At step 1803, the method may include authenticating a user of the first device and determining access rights of the user using an identity of the first device. At step 1804, the method may include transmitting digitally signed updates from the SMD to the first device. At step 1805, the method may include receiving, at the SMD, digitally signed first data from the first device. At step 1806, the method may include performing diagnostic and maintenance functions at the first device. At step 1807, the method may include exporting data from the first device to the SMD for mobile transfer to another platform.

FIG. 19 depicts an exemplary computer device or system, in which embodiments of the present disclosure, or portions thereof, may be implemented. Each of the computing system(s), databases, user interfaces, and methods described above with respect to FIGS. 1-18 can be implemented via device 1900 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-18.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-18, may be implemented using device 1900. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 19, device 1900 may include a central processing unit (CPU) 1920. CPU 1920 may be any type of processor device including, for example, any type of special purpose or a general-purpose microprocessor device. As will be appreciated by persons skilled in the relevant art, CPU 1920 also may be a single processor in a multi-core/multi-processor system, such system operating alone, or in a cluster of computing devices operating in a cluster or server farm. CPU 1920 may be connected to a data communication infrastructure 1910, for example, a bus, message queue, network, or multi-core message-passing scheme.

Device 1900 also may include a main memory 1940, for example, random access memory (RAM), and also may include a secondary memory 1930. Secondary memory 1930, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1930 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1900.

Device 1900 also may include a communications interface ("COM") 1960. Communications interface 1960 allows software and data to be transferred between device 1900 and external devices. Communications interface 1960 may include a modem, a network interface (such as an Ethernet card), a communications port, a PCMCIA slot and card, or the like. Software and data transferred via communications interface 1960 may be in the form of signals, which may be electronic, electromagnetic, optical, or other signals capable of being received by communications interface 1960. These signals may be provided to communications interface 1960 via a communications path of device 1900, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1900 also may include input and output ports 1950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method that provides a secure and assured method for updating software of a cyber-physical system (CPS) device, maintaining the CPS device, diagnosing the CPS device, and transferring of CPS data, the method comprising:
   connecting a secure maintenance device (SMD) to a first device of a CPS network via secure access smart hub (SASH), the first device being the CPS device comprising an actuator and wherein the SMD is designed to enable the CPS device to select an existing customer authentication service and comprises a user domain to work with the existing customer authentication service or to provide a framework for selecting a public key infrastructure (PKI) managed service;
   determining whether the existing customer authentication service selection has been made at the first device, wherein:
      upon a determination that the existing customer authentication service selection has been made, authenticating a moment the SMD is connected to the first device before a software-based communication is established via the existing customer authentication service; and
      upon a determination that the existing customer authentication service selection has not been made, authenticating the moment the SMD is connected to the first device before the software-based communication is established via the PKI managed service;
   establishing a secure communication channel between the SMD and the first device;
   authenticating a user of the first device and determining access rights of the user using an identity of the first device;
   transmitting digitally signed updates from the SMD to the first device;
   receiving, at the SMD, digitally signed first data from the first device;
   performing diagnostic and maintenance functions at the first device;
   and
   exporting data from the first device to the SMD via the SASH for mobile transfer to another platform.

2. The computer-implemented method of claim 1, further comprising encrypting and/or decrypting commands between the SMD and the first device by using existing network transport mechanism with a network protocol extension to network protocol TCP/IP.

3. The computer-implemented method of claim 1, wherein the SMD performs a diagnostic test on the first device.

4. The computer-implemented method of claim 1, further comprising creating two or more security domains that are isolated using different levels of security from each other and enabling for support of third-party diagnostics and maintenance software.

5. The computer-implemented method of claim 4, wherein the two or more security domains comprise at least one from among the user domain, a CPS domain, and/or a vendor domain.

6. The computer-implemented method of claim 4, further comprising isolating the two or more security domains from each other using hardware virtualization technology.

7. A system for securely maintaining, diagnosing, and updating a device while protecting security assurance of the device, the system comprising:
   a memory storing instructions; and
   a processor executing the instructions to perform a process including:
      connecting a secure maintenance device (SMD) to a first device of a cyber-physical system (CPS) network via secure access smart hub (SASH), the first device being a CPS device comprising an actuator and wherein the SMD is designed to enable the CPS device to select an existing customer authentication service and comprises a user domain to work with the existing customer authentication service or to provide a framework for selecting a public key infrastructure (PKI) managed service;
      determining whether the existing customer authentication service selection has been made at the first device, wherein:
         upon a determination that the existing customer authentication service selection has been made, authenticating a moment the SMD is connected to the first device before a software-based communication is established via the existing customer authentication service; and
         upon a determination that the existing customer authentication service selection has not been made, authenticating the moment the SMD is connected to the first device before the software-based communication is established via the PKI managed service;
      establishing a secure communication channel between the SMD and the first device;
      authenticating a user of the first device and determining access rights of the user using an identity of the first device;
      transmitting digitally signed updates from the SMD to the first device;
      receiving, at the SMD, digitally signed first data from the first device;
      performing diagnostic and maintenance functions at the first device; and
      exporting data from the first device to the SMD for mobile transfer to another platform.

8. The system of claim 7, wherein the process further comprises encrypting and/or decrypting commands between the SMD and the first device by using existing network transport mechanism with a network protocol extension to network protocol TCP/IP.

9. The system of claim 7, wherein the SMD performs a diagnostic test on the first device.

10. The system of claim 7, wherein the process further comprises creating two or more security domains that are isolated using different levels of security from each other, and enabling for support of third-party diagnostics and maintenance software.

11. The system of claim 10, wherein the two or more security domains comprise at least one from among the user domain, a CPS domain, and/or a vendor domain.

12. The system of claim 10, wherein the process further comprises isolating the two or more security domains from each other using hardware virtualization technology.

13. A non-transitory computer-readable medium storing instructions that, when executed by a processor, cause the processor to perform a method for securely maintaining, diagnosing, and updating a device while protecting security assurance of the device, the method comprising:

connecting a secure maintenance device (SMD) to a first device of a cyber-physical system (CPS) network via secure access smart hub (SASH), the first device being a CPS device comprising an actuator and wherein the SMD is designed to enable the CPS device to select an existing customer authentication service and the SMD comprises a user domain to work with the existing customer authentication service or to provide a framework for selecting a public key infrastructure (PKI) managed service;

determining whether the existing customer authentication service selection has been made at the first device, wherein:

upon a determination that the existing customer authentication service selection has been made, authenticating a moment the SMD is connected to the first device before a software-based communication is established via the existing customer authentication service; and upon a determination that the existing customer authentication service selection has not been made, authenticating the moment the SMD is connected to the first device before the software-based communication is established via the PKI managed service;

establishing a secure communication channel between the SMD and the first device;

authenticating a user of the first device and determining access rights of the user using an identity of the first device;

transmitting digitally signed updates from the SMD to the first device;

receiving, at the SMD, digitally signed first data from the first device;

performing diagnostic and maintenance functions at the first device;

and exporting data from the first device to the SMD for mobile transfer to another platform.

14. The non-transitory computer-readable medium of claim 13, wherein the method further comprises encrypting and/or decrypting commands between the SMD and the first device by using existing network transport mechanism with a network protocol extension to network protocol TCP/IP.

15. The non-transitory computer-readable medium of claim 13, wherein the SMD performs a diagnostic test on the first device.

16. The non-transitory computer-readable medium of claim 13, wherein the method further comprises creating two or more security domains that are isolated using different levels of security from each other, and enabling for support of third-party diagnostics and maintenance software.

17. The non-transitory computer-readable medium of claim 16, wherein the two or more security domains comprise at least one from among the user domain, a CPS domain, and/or a vendor domain.

\* \* \* \* \*